(12) United States Patent
Hayashi et al.

(10) Patent No.: US 6,209,675 B1
(45) Date of Patent: Apr. 3, 2001

(54) TRAVEL DRIVE APPARATUS FOR HYDRAULIC DRIVE WORK VEHICLE AND CONTROL METHOD THEREFOR

(75) Inventors: Seita Hayashi; Hideki Kado; Sadao Nunotani, all of Oyama (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/228,570

(22) Filed: Jan. 11, 1999

(30) Foreign Application Priority Data

Jan. 12, 1998 (JP) ................................................. 10-018229

(51) Int. Cl.$^7$ ................................................. B60K 17/10
(52) U.S. Cl. ................................................. 180/307; 180/165
(58) Field of Search ................................. 180/165, 305, 180/307, 338; 701/70, 78; 60/493, 494

(56) References Cited

U.S. PATENT DOCUMENTS

| | | | |
|---|---|---|---|
| 4,546,847 | * 10/1985 | Abels ................................... | 180/307 |
| 4,628,690 | * 12/1986 | Arai et al. ............................ | 60/494 |
| 4,694,647 | * 9/1987 | Yoshida ............................... | 60/494 |
| 5,361,584 | * 11/1994 | Langen et al. ...................... | 60/493 |
| 5,709,282 | * 1/1998 | Akira et al. ......................... | 180/307 |
| 5,848,531 | * 12/1998 | Nakamura et al. ................. | 60/454 |
| 6,067,795 | * 5/2000 | Iino et al. ............................ | 180/338 |

FOREIGN PATENT DOCUMENTS 61-37540 * 2/1986 (JP) ...................................... 180/307

* cited by examiner

*Primary Examiner*—Frank Vanaman
(74) *Attorney, Agent, or Firm*—Greer, Burns & Crain, Ltd.

(57) ABSTRACT

A travel drive apparatus for a hydraulic drive work vehicle and control method therefor, the apparatus including: a travel hydraulic pump driven by the power of an engine; a hydraulic motor that receives discharged oil from the travel hydraulic pump and causes the vehicle to travel; a travel changeover valve that receives the discharged oil from the travel hydraulic pump, supplies the discharged oil to the hydraulic motor and discharges return oil from the hydraulic motor to a tank, in which the travel drive apparatus comprises; an accelerator for controlling an engine rotational speed; an operation unit for selecting vehicle forward travel, stop, and reverse travel; the travel changeover valve being adapted for receiving signals from the operation unit, switching the discharge oil supplied from the travel hydraulic pump to the hydraulic motor, and controlling vehicle forward travel, stop and reverse travel; a relief valve that regulates pressure for controlling the hydraulic motor when the vehicle has decelerated, positioned between the travel changeover valve and the hydraulic motor; and a pressurizing unit for raising the set pressure at the relief valve controlling the hydraulic motor when the engine rotational speed is increased, while switching the vehicle from forward travel to reverse travel, or from reverse travel to forward travel, so that the work vehicle may switch over from forward to reverse travel; or vice versa, while exhibiting good acceleration performance.

7 Claims, 8 Drawing Sheets

TRAVEL DRIVE APPARATUS FOR HYDRAULIC DRIVE WORK VEHICLE AND CONTROL METHOD THEREFOR

BACKGROUND OF THE INVENTION

1. Field of the Invention

This invention pertains to a travel drive apparatus for a hydraulic drive work vehicle and a control method therefor, and more particularly to a travel drive apparatus for a hydraulic drive work vehicle, and a control method therefor, designed for a hydraulic drive vehicle that travels by driving a hydraulic motor with pressure oil from a variable delivery hydraulic pump for traveling that is driven by an engine.

2. Description of the Related Art

Variable delivery hydraulic pumps (hereinafter called hydraulic pumps) are conventionally used as pumps for generating oil under pressure for driving hydraulic shovels and other working machines or traveling equipment. These hydraulic pumps are equipped with power control mechanisms (hereinafter called regulators) to prevent the engine that drives the pump from stalling. Such a regulator controls the flow rate Q in response to the discharge pressure P, so that equipment is run with roughly constant torque (P×Q= constant). When the discharge pressure P is low, the force generated by a piston (not shown in the drawings) is smaller than the force of an opposing spring, wherefore the piston does not move, so that the cylinder block of the pump is in the position of maximum tilt angle, and the pump discharge quantity is also at maximum. When the load acting on the pump, that is, either the load of the working machine or the load when traveling, increases, the piston moves to a position that balances the force of the spring, decreasing the cylinder block tilt angle, and control is effected so that torque becomes constant. As described above, the spring used in the regulator pushes the cylinder block in the direction of maximum tilt angle. Alternatively, in another known example, the spring used in the regulator pushes the cylinder block in the direction wherein the tilt angle is minimized. Thus, when the engine is started, the load driving the pump becomes small, making engine startup easy.

Also known are hydraulic drive apparatuses, which use hydraulic pumps and hydraulic motors, for enabling hydraulic shovels and other construction equipment to travel. Among these known hydraulic drive apparatuses are those wherein the hydraulic pumps and hydraulic motors are connected in a closed circuit, and those wherein the hydraulic pumps and hydraulic motors are connected in an open circuit with changeover valves inserted between the hydraulic pumps and hydraulic motors. An example of such an open circuit is disclosed in Utility Model Registration No. 2543146, in gazette. According to this model, as diagrammed in FIG. 9, this hydraulic circuit comprises a hydraulic pump 201 for driving various actuators in the work vehicle, compound control valves 202A, 202B that are collection of control valves for controlling the supply of pressure oil from the hydraulic pump 201 to each of various actuators, and a travel hydraulic motor 204 that is drive-controlled by travel control valves 203a, 203b for the compound control valves 202A, 202B. To a main line 205 for the travel hydraulic motor 204 are connected crossover relief valves 206, counterbalance valves 207, and lower makeup valves 208. The lower makeup valves 208 and an oil tank 210 are connected by a makeup circuit 212, and an oil cooler 211 is provided in the return oil line of the compound control valve 202A. A center joint CJ is also provided for circulating oil between an upper revolving structure and a lower revolving structure.

As based on the present invention, furthermore, while one end of the makeup circuit 212A is connected to the main lines 205A, 205B via a lower makeup valve (second makeup valve) 208, the other end thereof is connected to a line 222 upstream of a cooler relief valve 221 via the makeup circuit 212B. The upstream line 222 is the return line for the compound control valves 202A, 202B. Also, upper main lines 205C, 205D between the center joint CJ and the travel control valves 203a, 203b built into the compound control valves 202A, 202B is connected to the makeup circuit 212B via an upper makeup valve (first makeup valve) 223, and makeup oil is replenished from various portions to the upper main lines 205C, 205D. A hydraulic pump 201D is a steering hydraulic pump, connected to a hydraulic steering cylinder 225 via a steering valve 224. The return oil from the steering valve 224 is connected to the upstream line 222 of the cooler relief valve 221 via the return line 226 and the makeup circuit 212B. Thus makeup oil is introduced to the upper main lines 205C, 205D on the side of the upper revolving structure that connects the center joint CJ and the compound control valves 202A, 202B. Accordingly, if a large flow rate of makeup oil is introduced, a large flow rate of makeup oil will be conveyed all the way to the travel hydraulic motor 204 installed in a lower traveling body. Also, the return oil from the steering hydraulic pump 201D is merged into the makeup circuit 212, wherefore an adequate makeup flow rate can be secured. Accordingly, cavitation can be definitely prevented in the travel hydraulic motor 204. In addition, makeup oil is also replenished directly to a lower main line from the makeup circuit 212. The pressure of the makeup oil can be set by the cooler relief pressure, and it is stated that replenishment efficiency is improved.

With a hydraulic drive apparatus for effecting travel in a hydraulic shovel or other construction machine, however, there are problems. Namely, when decelerating, descending a slope, or changing either from forward travel to reverse travel or from reverse travel to forward travel, cavitation occurs which damages the hydraulic motor, and, when descending a slope, due to overrun, the vehicle ceases to be controllable. Therefore, when a closed circuit configuration is used, in order to prevent overruns, the inertial energy of the working vehicle (roughly 125% of the d vehicle speed) must absorb the inertial energy generated by the reverse drive torque of the engine. Hence, in order to absorb this with the travel hydraulic pump and travel hydraulic motor, the capacity (discharge volume per revolution, in cc/rev) has to be made large. With the closed circuit configuration, moreover, oil is supplied from a charge pump on the intake side of the closed circuit so that cavitation does not occur, and the supply volume of this charge pump must also be made large. Thus, the charge pump drive force must become large, and the engine output horsepower must be increased. The engine will become large, and wasted energy will be developed when traveling normally. The maximum traveling speed is determined by the capacities of the hydraulic pump and hydraulic motor, wherefore, at the very least, it is necessary to use a hydraulic pump having large capacity from the outset. In a large working vehicle, a hydraulic pump having larger discharge capacity will become necessary, and, together therewith, it will be necessary to increase the engine output horsepower, which is uneconomical. Next, according to Utility Model Registration No. 2543146, in gazette, configured with an open circuit, makeup oil is replenished from the makeup valve when normally moving forward, moving in reverse, accelerating, or descending a slope, and cavitation is prevented. However, when changing from forward travel to reverse travel or from reverse travel to forward travel, cavitation develops, damaging the hydraulic motor, and rendering control of the vehicle impossible. Suppose, for example, that an operator moves travel control valves 203a, 203b from the forward position (A) past neutral to the reverse position (C), thereby changing the vehicle from forward travel to reverse travel. While moving forward, pressure oil passes through the upper main line 205A and reaches the intake 204A in the travel hydraulic motor 204, turning the travel hydraulic motor 204, and moving the vehicle forward. When reverse travel is changed to, the pressure oil, from the reverse position (C) of the travel control valves 203a, 203b, passes through the upper main circuit 205D, reaches the counterbalance valve 207, and switches the counterbalance valve 207 to the reverse position (C). The pressure oil from the hydraulic pump 201, from the counterbalance valve 207 in the reverse position (C), passes through the lower main circuit 205B, reaches the intake 204B in the travel hydraulic motor 204, and tries to turn the travel hydraulic motor 204 and make the vehicle move in reverse. At this time, the travel hydraulic motor 204 is still turning in the forward direction due to the inertial energy of the vehicle, and oil is being discharged from the intake 204B in the travel hydraulic motor 204. For this reason, the pressure oil from the hydraulic pump 201 and the oil from the travel hydraulic motor 204 are discharged to the lower main circuit 205B and put under high pressure, whereupon the crossover relief valve 206 is activated. With the oil from this crossover relief valve 206, makeup oil is replenished to the lower main circuit 205B via the upper makeup valve (first makeup valve) 223, and cavitation is prevented. At this time, however, the oil discharged from the hydraulic pump 201 is at high pressure, wherefore, in the conventional hydraulic circuit, a regulator is used to reduce the discharge quantity of the hydraulic pump, so makeup oil is not adequately replenished to the lower main circuit 205B, and cavitation occurs. When the inertial energy of the vehicle is large, the discharge quantity of the hydraulic pump will become smaller while the crossover relief valve 206 is operating, cavitation will occur, and the vehicle will not stop within the designated range, which is a problem. Accordingly, in a hydraulic drive apparatus configured with an open circuit, there is a problem in that the operations of changing over from forward travel to reverse travel and from reverse travel to forward travel are very difficult.

In view of the problems set forth above, the present invention pertains to a travel drive apparatus for a hydraulic drive work vehicle, and an object thereof is to provide a travel drive apparatus for a hydraulic drive work vehicle exhibiting good acceleration performance, and a control method therefor, wherewith, particularly for a hydraulic drive work vehicle wherein a work machine is loaded on a hydraulic drive vehicle, it is possible to perform switching operations from forward travel to reverse travel or from reverse travel to forward travel.

SUMMARY OF THE INVENTION

In order to attain the object set forth above, a first invention is a travel drive apparatus for a hydraulic drive work vehicle including: a travel hydraulic pump driven by the power of an engine; a hydraulic motor that receives discharged oil from the travel hydraulic pump and causes the vehicle to travel; a travel changeover valve that receives the discharged oil from the travel hydraulic pump, supplies the discharged oil to the hydraulic motor and discharges return oil from the hydraulic motor to a tank, wherein the apparatus comprises: acceleration means for controlling engine rotational speed; operation means for selecting vehicle forward travel, stop, and reverse travel; the travel changeover valve being adapted for receiving signals from the operation means, switching the discharge oil supplied from the travel hydraulic pump to the hydraulic motor, and controlling vehicle forward travel, stop, and reverse travel; a relief valve that regulates pressure for controlling the hydraulic motor when the vehicle has decelerated, positioned between the travel changeover valve and the hydraulic motor; and pressurizing means for raising the set pressure at a relief valve controlling the hydraulic motor when engine rotational speed has been increased and lowering the set pressure on a relief valve controlling the hydraulic motor when engine rotational speed has been decreased, while switching the vehicle from forward travel to reverse travel, or from reverse travel to forward travel.

As based on the configuration described in the foregoing, when an operator switches the vehicle from forward travel to reverse travel, or from reverse travel to forward travel, and has increased engine rotational speed, the set pressure at the relief valve controlling the hydraulic motor rises, the braking force is increased, and both stopping time and stopping distance are shortened. Also, since engine rotational speed is being increased, the pressure on the braking side is being raised, wherefore the takeoff torque from stop to forward travel becomes large, and acceleration speed rises rapidly. When engine rotational speed has been reduced, on the other hand, the set pressure at the relief valve controlling the hydraulic motor is lowered, the braking force is reduced, and both stopping time and stopping distance are lengthened.

Accordingly, the changeover operations from forward travel to reverse travel and from reverse travel to forward travel that are very difficult with the conventional open circuit become possible, while the engine rotational speed at such times can be increased, shortening stopping times and stopping distances. In addition, takeoff acceleration performance is improved, thus improving work efficiency. Also, the work vehicle responds to and follows the will of the operator, so operability is improved. Switching from forward travel to reverse travel or from reverse travel to forward travel can be done with hydraulic equipment, moreover, so operations can be done inexpensively with a simple structure. Also, when engine rotational speed has been reduced, the braking force is reduced, lengthening stopping time and stopping distance, thus reducing jolting, and making the braking distance roughly constant irrespective of engine rotational speed.

In a second invention based on the first invention, the pressurizing means comprise an unloading valve for adjusting the discharge pressure of the travel hydraulic pump to low pressure while switching the vehicle from forward travel to reverse travel or from reverse travel to forward travel, and a restrictor valve, positioned between the relief valve and the tank, for restricting and raising the pressure on the oil discharged from the travel hydraulic pump via the unloading valve, while switching the vehicle from forward travel to reverse travel or from reverse travel to forward travel, and raising the set pressure at the relief valve.

As based on the configuration described above, the discharged oil from the travel hydraulic pump that is increasing with the increase in engine rotational speed is supplied via the unloading valve to the restrictor valve, and restricted by the restrictor valve so that its pressure increases. This pressure acts on the relief valve, increases the braking force, shortens the stopping time and stopping distance, and increases takeoff acceleration performance.

Accordingly, the discharge quantity from the travel hydraulic pump that is increasing as the engine rotational speed increases is restricted by the restrictor valve so that its pressure increases, wherefore the set pressure at the relief valve increases automatically due to the hydraulic equipment, and the hydraulic circuit becomes simple and inexpensive. Also, since control is performed with hydraulic equipment, there cease to be malfunctions, and both maintainability and safety are enhanced.

In a third invention based on the first invention, the pressurizing means comprise a control hydraulic pump that is driven by engine power, for discharging a discharge quantity in response to engine rotational speed, and a restrictor valve, positioned between the relief valve and the tank, for restricting and raising the pressure on the oil discharged from the control hydraulic pump, while switching the vehicle from forward travel to reverse travel or from reverse travel to forward travel, and raising the set pressure at the relief valve.

As based on the configuration described above, the discharged oil from the travel hydraulic pump that is increasing with the increase in engine rotational speed is supplied to the restrictor valve, and restricted by the restrictor valve so that its pressure increases.

This pressure acts on the relief valve, increases the braking force, shortens the stopping time and stopping distance, and increases takeoff acceleration performance.

Accordingly, the discharge quantity from the travel hydraulic pump that is increasing as the engine rotational speed increases is restricted by the restrictor valve so that its pressure increases, wherefore the set pressure at the relief valve increases automatically due to the hydraulic equipment, and the hydraulic circuit becomes simple and inexpensive. Also, since control is performed with hydraulic equipment, there cease to be malfunctions, and both maintainability and safety are enhanced.

In a fourth invention based on the third invention, the pressurizing means comprise a control hydraulic pump driven by engine power, and a restrictor valve that connects with the control hydraulic pump, restricting the discharged oil, whereupon a control pressure responsive to engine rotational speed is produced, and that supplies the control pressure to the relief valve and raises the pressure.

As based on the configuration described above, the discharged oil from the travel hydraulic pump that is increasing with the increase in engine rotational speed is supplied to the restrictor valve, and restricted by the restrictor valve so that its pressure increases.

This pressure acts on the relief valve, increases the braking force, shortens the stopping time and stopping distance, and increases takeoff acceleration performance.

Accordingly, as noted earlier, the discharge quantity from the travel hydraulic pump that is increasing as the engine rotational speed increases is restricted by the restrictor valve so that its pressure increases, wherefore the set pressure at the relief valve increases automatically due to the hydraulic equipment, and the hydraulic circuit becomes simple and inexpensive. Also, since control is performed with hydraulic equipment, there cease to be malfunctions, and both maintainability and safety are enhanced.

In a fifth invention based on any one of the first to the fourth inventions, the relief valve comprises a piston unit that is connected to the relief valve and can make variable the pressure regulation of the relief valve, and a control valve that is connected to the piston unit, detects that the relief valve has been activated and switches it, cuts off the circuit from the piston unit to the tank, and makes the relief valve variable.

As based on the configuration described above, when switching over from forward travel to reverse travel or from reverse travel to forward travel, the return oil from the hydraulic motor oppositely driven by the inertial energy of the work vehicle is restricted by the travel changeover valve so that it attains high pressure. However, a relief valve inserted between the travel changeover valve and the hydraulic motor, by means of the piston unit and the control valve that controls the operation of the piston unit, variably adjusts the pressure acting on the hydraulic motor. This pressure that acts on the hydraulic motor is made variable so that it becomes higher when the inertial energy of the work vehicle is great.

Accordingly, by making the pressure variable in response to the inertial energy of the work vehicle, the vehicle braking distance becomes roughly constant. Also, the pressure varies in response to the inertial energy of the work vehicle, so jolting during braking is reduced.

In a sixth invention based on the first invention, the travel hydraulic pump comprises a variable delivery hydraulic pump equipped with a regulator, and the regulator comprises a servo valve that is activated, receiving pressure that drives the hydraulic motor at one end and signals responsive to engine rotational speed at the other end, and a piston cylinder that receives pressure that drives the hydraulic motor in one chamber, and pressure that drives the hydraulic motor via the servo valve in the other chamber, that houses a spring, and that discharges, from the travel variable delivery hydraulic pump, a discharge quantity such that the pressure driving the hydraulic motor is made less than a prescribed value by the force of the spring, when engine rotational speed is below a prescribed value and the hydraulic motor is driven oppositely from the vehicle.

As based on the configuration described above, the servo valve is activated upon receiving the low pressure driving the hydraulic motor and the low engine rotational speed, and the regulator supplies the pressure driving the hydraulic motor to the piston cylinder. The piston cylinder is activated, receiving in one cylinder the pressure driving the hydraulic motor, and in the other chamber the pressure driving the hydraulic motor and the force of the spring, so that, when engine rotational speed is below a prescribed value and the hydraulic motor is driven oppositely from the vehicle, a discharge quantity is discharged from the travel variable delivery hydraulic pump such that the pressure driving the hydraulic motor becomes lower than a prescribed value due to the force of the spring.

Accordingly, when the hydraulic motor is acted on by an opposite drive and the driving pressure is low, there is no need to use other hydraulic equipment to prevent cavitation, it being necessary only to increase the discharge volume of the travel variable delivery hydraulic pump, making it possible to operate inexpensively with a simple structure.

A first invention that is a control method for a travel drive apparatus for a hydraulic drive work vehicle according to the present invention is a method for controlling a travel drive apparatus for a hydraulic drive work vehicle comprising: a travel hydraulic pump driven by the power of an engine; a hydraulic motor that receives discharged oil from the travel hydraulic pump and causes the vehicle to travel; and a travel changeover valve that receives discharged oil from the travel hydraulic pump, supplies the discharged oil to the hydraulic motor and discharges return oil from the hydraulic motor to a tank; wherein: the set pressure at a relief valve which controls the hydraulic motor is raised when engine rotational speed has been increased while switching the vehicle from forward travel to reverse travel or from reverse travel to forward travel.

Based on the method described in the foregoing, when the vehicle is switched over from forward travel to reverse travel or from reverse travel to forward travel, the hydraulic motor is driven backward by the inertial energy of the work vehicle, and the return oil from the hydraulic motor is restricted by the travel changeover valve, making it high-pressure, whereupon the relief valve is activated. Braking torque develops as a result of this high-pressure braking pressure. At this time, when engine rotational speed is increased, the discharge quantity from the hydraulic pump also increases according to the increase in engine rotational speed This discharge quantity from the hydraulic pump is restricted so that its pressure rises, and this pressure acts on the relief valve to further raise the braking pressure that brakes the hydraulic motor.

Accordingly, even when switching over from forward travel to reverse travel or from reverse travel to forward travel, a high-pressure braking pressure develops so that the vehicle decelerates and stops, and the vehicle begins moving in the opposite direction. At this time, due to the fact that the engine rotational speed increases, the high-pressure braking pressure becomes even higher, increasing the braking force, so that stopping time and stopping distance can be shortened. And, both because the engine rotational speed is being increased and because the pressure on the braking side is being raised, the startup torque when departing from a standstill becomes larger, the acceleration speed rises rapidly at takeoff, and work efficiency is improved. The work vehicle responds to and follows the will of the operator, moreover, so operability is improved. It is also possible now to use hydraulic equipment to make the switchover from forward travel to reverse travel or from reverse travel to forward travel, so this can be performed inexpensively with a simple structure.

A second invention that is a control method for a travel drive apparatus for a hydraulic drive work vehicle according to the present invention is a method for controlling a travel drive apparatus for a hydraulic drive work vehicle comprising: a travel hydraulic pump driven by the power of an engine; a hydraulic motor that receives discharged oil from the travel hydraulic pump and causes the vehicle to travel; and a travel changeover valve that receives discharged oil from the travel hydraulic pump, supplies the discharged oil to the hydraulic motor and discharges return oil from the hydraulic motor to a tank; wherein: when engine rotational speed has been increased while switching the vehicle from forward travel to reverse travel or from reverse travel to forward travel, the discharge oil from the control pump is increased to accord with the engine rotational speed, that discharge oil is restricted, thereby raising its pressure, that pressure is sent to the relief valve, the set pressure at the relief valve is raised, and the hydraulic motor is braked.

Based on the method described in the foregoing, when the vehicle is switched over from forward travel to reverse travel or from reverse travel to forward travel, the return oil from the hydraulic motor being driven backward by the inertial energy of the work vehicle is restricted by the travel changeover valve, making it high-pressure, whereupon the relief valve is activated, so that a braking torque acts on the vehicle. This braking torque increases engine rotational speed, and increases the discharge oil from the control pump to match the engine rotational speed This discharge oil is restricted to further raise its pressure, making it possible to shorten stopping time and stopping distance, and to increase acceleration performance at takeoff.

Accordingly, the pressure acting on the hydraulic motor becomes variable in response to the inertial energy of the work vehicle, and this pressure is maintained during this time, wherefore the vehicle braking distance becomes roughly constant. During this time also the discharge oil from the travel variable delivery hydraulic pump is being increased, so cavitation is prevented from occurring. The same benefits are realized, moreover, as with the first control method described above.

DESCRIPTION OF THE PREFERRED EMBODIMENTS

Figure 1:
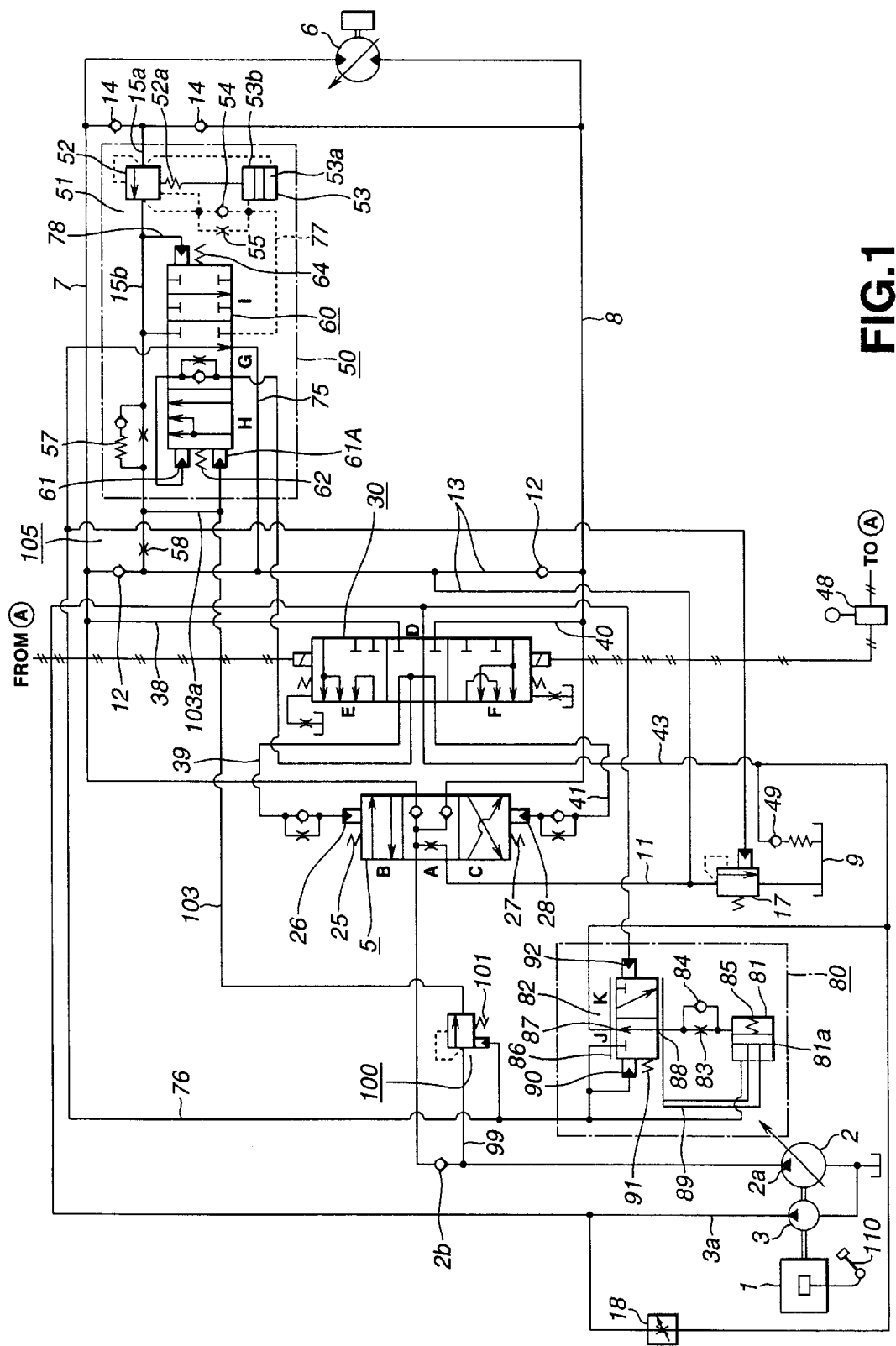
FIG. 1 is a hydraulic diagram for a first embodiment of the travel drive apparatus for a hydraulic drive work vehicle.
Figure 2:
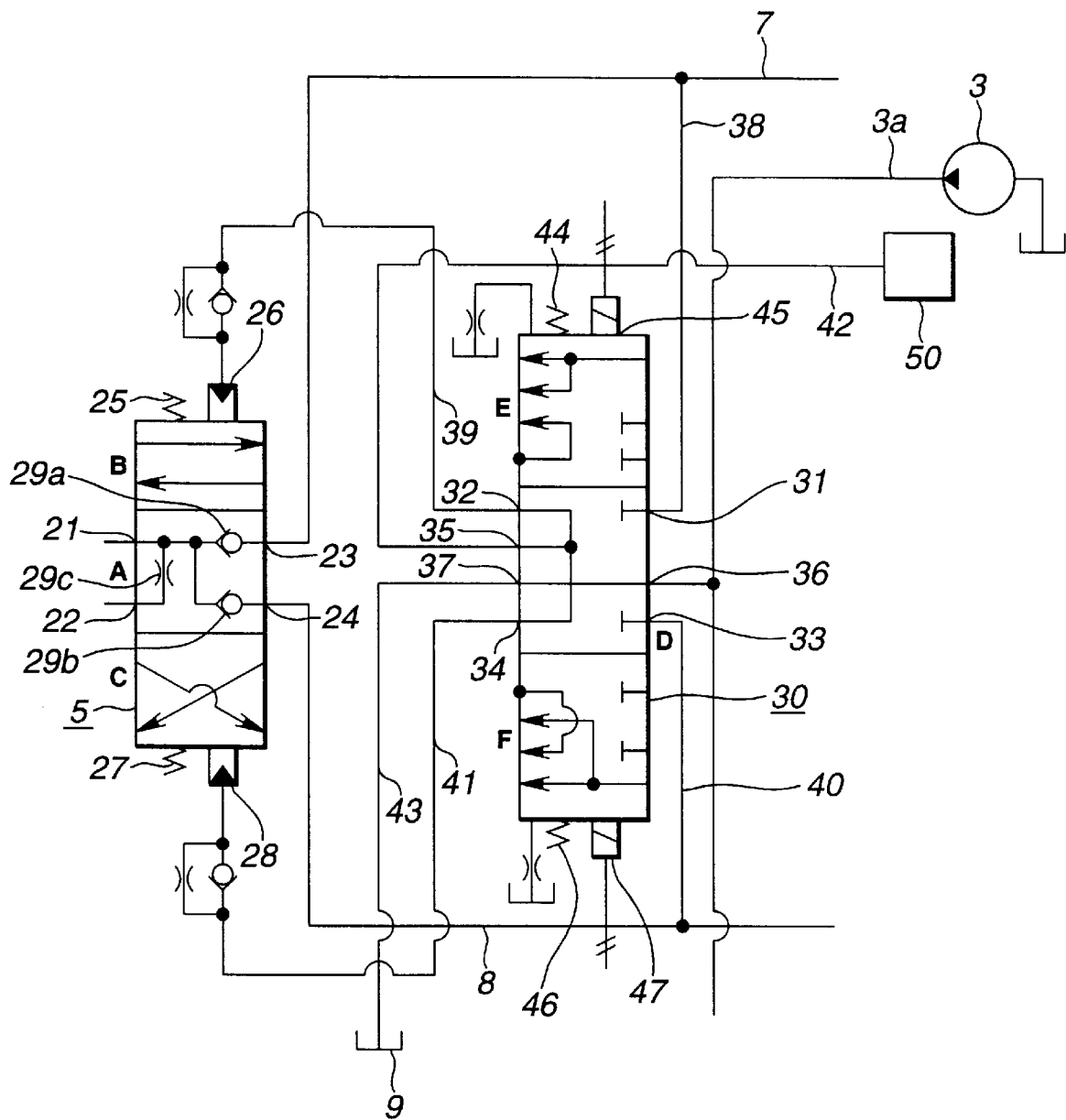
FIG. 2 is an enlarged diagram of the travel valve and pilot pressure supply valve noted in FIG. 1.
Figure 3:
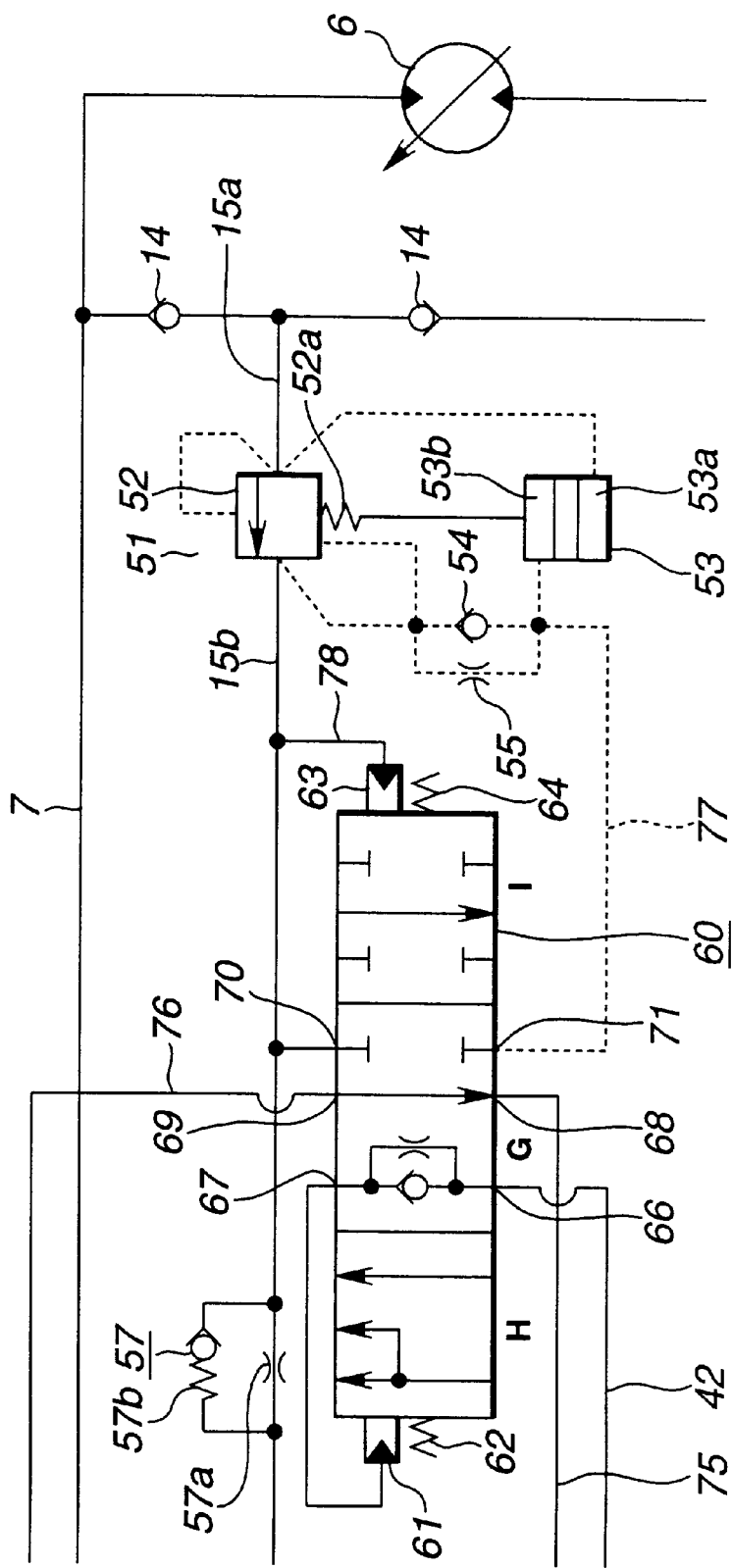
FIG. 3 is an enlarged diagram of the modulation relief valve noted in FIG. 1.

Embodiments of the present invention are now described, making reference to the drawings. FIG. 1 is a hydraulic circuit diagram representing an embodiment of a travel drive apparatus for a hydraulic drive work vehicle according to the present invention; FIG. 2 is an enlarged diagram of the travel valve and pilot pressure supply valve noted in FIG. 1; and FIG. 3 is an enlarged diagram of the modulation relief valve noted in FIG. 1.

As diagrammed in FIG. 1, an engine 1 drives a variable delivery type travel hydraulic pump 2 and a fixed capacity type control hydraulic pump 3. The discharge line 2a from the travel hydraulic pump 2 is connected to a travel valve 5. To the travel valve 5 are connected a first main circuit 7 and a second main circuit 8 leading to the travel hydraulic motor, and a return circuit 11 leading to a tank 9. The travel valve 5 switches the pressure oil from the travel hydraulic pump 2 to either the first main circuit 7 or the second main circuit 8 going to the travel hydraulic motor 6, and returns the return oil from the travel hydraulic motor 6 to the tank 9. To the first main circuit 7 and second main circuit 8, respectively, are connected intake valves 12 and 12. These intake valves 12 and 12 are connected, respectively, to a return circuit 11 going to the tank 9 by an intake circuit 13. The intake valves 12 supply oil to either the first main circuit 7 or the second main circuit 8 when either the first main circuit 7 or second main circuit 8 falls below a prescribed pressure, thus preventing the occurrence of cavitation in the oil supplied to the travel hydraulic motor 6.

To the first main circuit 7 and the second main circuit 8, respectively, are connected check valves 14 and 14 acting as relief valves, and, via a relief circuit 15*a*, a modulation relief valve 50. A return relief circuit 15*b* for the modulation relief valve 50 passes through the intake circuit 13 and is connected to the return circuit 11 going to the tank 9. The modulation relief valve 50 is activated when either the first main circuit 7 or the second main circuit 8 reaches or exceeds a prescribed pressure, regulating the circuit pressure and applying a brake to the vehicle. The return oil from the modulation relief valve 50, moreover, passes through the intake circuit 13 and is supplied either to the first main circuit 7 or the second main circuit 8 by the intake valves 12 and 12.

A back-pressure valve 17 is inserted in the return circuit 11 going to the tank 9. As necessary, the pressure is raised on the oil returning to the tank 9 from the travel valve 5, intake circuit 13, or return relief circuit 15*b* and supplied from the intake valves 12 and 12 to either the first main circuit 7 or the second main circuit 8, wherefore the oil volume is increased and cavitation is prevented.

An oil line splitting off from the discharge line 3*a* from the control hydraulic pump 3 communicates with the tank 9 via a variable restrictor 18, so as to generate pressure in response to the discharge quantity from the control hydraulic pump 3, that is, pressure produced by the turning speed of the engine 1.

As diagrammed in FIG. 2, the travel valve 5 comprises four ports, namely a pump port 21, tank port 22, and first and second actuator ports 23 and 24. To the pump port 21 is connected the discharge line 2*a* from the travel variable delivery hydraulic pump 2. To the tank port 22 is connected the tank 9. To the first actuator port 23 is connected the first main circuit 7. And to the second actuator port 24 is connected the second main circuit 8.

The travel valve 5 is provided on one end with a first spring 25 and a first pressure unit 26, and on the other end with a second spring 27 and a second pressure unit 28. The travel valve 5 is made in a pilot pressure switching configuration wherein it is held in a neutral position A by the first and second springs 25 and 27, switched to a forward position B by the pressure in the first pressure unit 26, and switched to a reverse position C by the pressure in the second pressure unit 28. The neutral position A of the travel valve 5 is provided with first and second check valves 29*a* and 29*b* and with a restrictor 29*c*, the first check valve 29*a* being located between the pump port 21 and the first main circuit 7, and the second check valve 29*b* being located between the pump port 21 and the second main circuit 8. The first and second check valves 29*a* and 29*b* are provided so as to block flows both from the pump port 21 toward the first and second actuators 23 and 24, and from the first and second actuators 23 and 24 toward the pump port 21. The restrictor 29*c* is positioned between the pump port 21 and the tank port 22 to restrict flow to the tank 9 so as to prevent the pressure in the first main circuit 7 and second main circuit 8 going to the travel hydraulic motor 6 from falling below a prescribed pressure (from becoming a negative pressure, for example). To the first and second pressure units 26 and 28 of the travel valve 5 is supplied, as pilot pressure, the pressure in the first and second main circuits 7 and 8, via a pilot pressure supply valve 30 (described below).

The pilot pressure supply valve 30 comprises seven ports, namely first, second, third, fourth, fifth and sixth ports 31, 32, 33, 34, 35 and 36, and a tank port 37. The first port 31 is connected to the first main circuit 7 by a first pilot circuit 38, the second port 32 is connected to the first pressure unit 26 by a second pilot circuit 39, the third port 33 is connected to the second main circuit 8 by a third pilot circuit 40, and the fourth port 34 is connected to the second pressure unit 28 by a fourth pilot circuit 41. The fifth port 35 is connected to the modulation relief valve 50 by a fifth pilot circuit 42. The sixth port 36 is connected to the control hydraulic pump 3 via the discharge line 3*a*. The tank port 37 is connected to the tank 9 by a second return circuit 43.

The pilot pressure supply valve 30 has three positions, namely a neutral position D, a forward position E, and a reverse position F. The pilot pressure supply valve 30 is provided at one end with a first spring 44 and a first solenoid 45, and at the other end with a second spring 46 and a second solenoid 47. The pilot pressure supply valve 30 has an electromagnetic switching configuration wherewith it is maintained in the neutral position D by the first spring 44 and second spring 46, moved to the forward position E by the first solenoid 45, and moved to the reverse position F by the second solenoid 47. Current is supplied to the first solenoid 45 and the second solenoid 47 by manipulating an operation unit 48 (described below).

In the neutral position D, the first port 31 and third port 33 are closed off, while the other ports (i.e. the second port 32, fourth port 34, fifth port 35, sixth port 36, and tank port 37) are all connected, and the discharge oil from the control hydraulic pump 3 has back pressure applied to it by a back-pressure check valve 49 (cf. FIG. 1) in front of the tank 9.

In the forward position E, the third port 33 and sixth port 36 are closed off, while either the first port 31, second port 32, and fifth port 35, or the fourth port 34 and tank port 37, respectively, are connected. When activated, the pressure in the first main circuit 7 is supplied to the first pressure unit 26 in the travel valve 5, while the oil in the second pressure unit 28 is returned to the tank 9.

In the reverse position F, the first port 31 and sixth port 36 are closed off, while the third port 33, fourth port 34, and fifth port 35, or the second port 32 and tank port 37, respectively, are connected. When activated, the pressure in the second main circuit 8 is supplied to the second pressure unit 28 in the travel valve 5, while the oil in the first pressure unit 26 is returned to the tank 9.

The operation unit 48 (cf. FIG. 1) is used when selecting either forward travel or reverse travel. When selecting forward travel, for example, the operation unit 48 is manipulated to the right in the figure (FIG. 1), sending current to the first solenoid 45 and changing the pilot pressure supply valve 30 to the forward position E. The pilot pressure supply valve 30 supplies the pressure in the first main circuit 7 to the first pressure unit 26 in the travel valve 5, as a pilot pressure, switching the travel valve 5 to the forward position B. The pressure in the travel hydraulic pump 2 is supplied via the travel valve 5 in the forward position B, and the first main circuit 7, to the travel hydraulic motor 6, turning the motor so as to drive the vehicle forward. When selecting reverse travel, the procedure is the opposite. That is, the operation unit 48 is manipulated to the left, as diagrammed, current is sent to the second solenoid 49, and the pilot pressure supply valve 30 is switched over to the reverse position F. As diagrammed in FIG. 1, the modulation relief valve 50 comprises a variable relief valve 51, control valve 60, first restrictor unit 57, and second restrictor unit 58.

The variable relief valve 51, as diagrammed in FIG. 1 and FIG. 3, comprises a variable relief valve 52, a piston unit 53, a check valve 54, and a restrictor 55.

The variable relief valve 52 is connected to the first main circuit 7 and the second main circuit 8 via the check valves 14 and 14, acting as relief valves, and the relief circuit 15a, and is also connected to the return circuit 11 going to the tank 9 via the return relief circuit 15b and the intake circuit 13. The pressure in the relief circuit 15a is led to and acts on one end of the variable relief valve 52, while the pressure in the return relief circuit 15b is led to and acts on the other end, which is also provided with a spring 52a. The piston unit 53 is linked to the spring 52a, and the force of this piston unit 53 acts on the spring 52a. Thus the load of the spring 52a acting on the other end of the variable relief valve 52 can be made variable, and the regulating pressure at the variable relief valve 52 can be made variable. The pressure in the relief circuit 15a is led to and acts in a piston bottom chamber 53a in the piston unit 53, and the piston unit 53 compresses the spring 52a. The piston head chamber 53b of the piston unit 53 is connected via the check valve 54 and the restrictor 55 to the return relief circuit 15b.

The variable relief valve 52 is set up so that, when the vehicle is traveling normally, either the pressure developed in the first main circuit 7 or the pressure developed in the second main circuit 8 acts on one end of the variable relief valve 52 and in the piston bottom chamber 53a of the piston unit 53, so that the pressure produced in the first main circuit 7 or second main circuit 8 due to travel becomes at or lower than a prescribed regulated pressure (say 420 kg/cm$^2$, for example). The variable relief valve 52, in addition, during vehicle braking or deceleration, restricts the oil returning to the return relief circuit 15b from the piston head chamber 53b by the restrictor 55, raising the pressure thereon, and retarding and weakening the compression of the spring 52a by the piston unit 53, so as to make the pressure generated in the first main circuit 7 or second main circuit 8 become a control pressure (pressure variable from 150 to 420 kg/cm$^2$, for example) following the inertial energy of the vehicle.

The variable relief valve 52, furthermore, when the vehicle is braking or decelerating, raises the pressure by the manipulation of the accelerator pedal 110 when it is desired to increase vehicle speed.

If a control input is made during reverse travel to effect forward travel, and the accelerator pedal 110 is depressed, when it is desired to increase the vehicle speed in the forward direction, the pressure is raised, shortening the braking time (braking distance), and the vehicle speed in the forward direction is increased.

The control valve 60, as diagrammed in FIG. 1 and FIG. 3, is configured with three positions and six ports, provided at one end with a third pressure unit 61 and spring 62, and tenth pressure unit 61A and provided at the other end with a fourth pressure unit 63 and spring 64. The three positions are a neutral position G positionally determined by the springs 62 and 64, a travel position H for forward or reverse travel, and a relief position I for braking. A first port 66 is connected by the fifth pilot circuit 42 to the fifth port 35 of the pilot pressure supply valve 30. The second port 67 is connected to the third pressure unit 61. A third port 68 is connected by a sixth pilot circuit 75 to the intake circuit 13. A fourth port 69 is connected by a seventh pilot circuit 76 to a regulator 80 (described below) in the travel hydraulic pump 2. A fifth port 70 is connected to the return relief circuit 15b. The sixth port 71 is connected by an eighth pilot circuit 77 to the piston head chamber 53b. And the fourth pressure unit 63 is connected by an eighth pilot circuit 78 to the return relief circuit 15b.

The tenth pressure unit 61A is connected to the return relief circuit 15b and the unloading valve 100 described below.

The control valve 60, furthermore, is in the relief position I when the vehicle is braking, cutting off the oil returning from the piston head chamber 53b to the return relief circuit 15b via the eighth pilot circuit 77 and the control valve 60. At this time, the oil returning from the piston head chamber 53b to the return relief circuit 15b is restricted by the restrictor 55 so that its pressure is raised, thereby both retarding and weakening the contraction of the spring 52a by the piston unit 53, and the pressure developed in the first main circuit 7 or second main circuit 8 becomes a braking pressure (for example, a pressure variable from 150 to 420 kg/cm$^2$) that is caused by the inertial energy of the vehicle.

The first restrictor unit 57 comprises a first restrictor 57a and a check valve 57b. The first restrictor 57a increases the resistance to the return oil flowing to the return relief circuit 15b, while a prescribed pressure (2 kg/cm$^2$, for example) is generated by the check valve 57b. This prescribed pressure acts from the eighth pilot circuit 78 and the fourth pressure unit 63, switching the control valve 60 to the relief position I when the variable relief valve 52 is activated.

The second restrictor unit 58, when the accelerator pedal is depressed, while braking, so that the discharge quantity QA from the travel hydraulic pump 2 is increased, increases resistance to the return oil flowing to the return relief circuit 15b, raises the adjustment pressure at the variable relief valve 52, and raises the braking force.

As diagrammed in FIG. 1, a regulator 80 is attached to the travel hydraulic pump 2 to make the pump discharge volume (i.e., the discharge volume per revolution, in cc/rev) variable. This regulator 80 comprises a piston cylinder 81, a servo valve 82, a restrictor 83, and a check valve 84. The piston cylinder 81 is connected to an inclined plate (not shown), receives oil from the servo valve 82 for controlling the tilt angle, and makes the discharge volume of the pump variable. On the bottom side of the piston cylinder 81 a spring 85 is inserted to compress the piston 81a in order to increase both the tilt angle and the pump discharge volume. The pilot pressure (Pac) from either the first main circuit 7 or second main circuit 8 is received on the head side of the piston cylinder 81 via the control valve 60.

The servo valve 82 is configured with two positions and three ports. A first port 86 is connected to the seventh pilot circuit 76, and receives the pilot pressure (Pac) from either the first main circuit 7 or second main circuit 8 via the control valve 60. A second port 87 is connected to the second return circuit 43. A third port 88 is connected to the piston cylinder 81 via the restrictor 83 and check valve 84. The servo valve 82 is connected by a link 89 to the piston cylinder 81 and moves together therewith.

The servo valve 82 is provided at one end with a fifth pressure unit 90 and spring 91, and at the other end with a sixth pressure unit 92.

The fifth pressure unit 90 receives the pilot pressure (Pac) from the seventh pilot circuit 76 via the control valve 60. The sixth pressure unit 92 receives the pressure developed in response to the turning speed of the engine 1, via an oil line 93 branching off from the discharge line 3a of the control hydraulic pump 3.

The servo valve 82 is in the J position when, while traveling, the drive pressure is high in either the first main circuit 7 or second main circuit 8 that drives the travel hydraulic motor 6, moving the piston cylinder 81 to the right, as diagrammed, against the force of the spring 91, and reducing the discharge volume (cc/rev). When the drive pressure is low during travel, and the engine turning speed is high, the servo valve 82 is in the K position, moving the piston cylinder 81 to the left, as diagrammed, working with the spring 91, to increase the discharge volume (cc/rev). When the travel hydraulic motor 6 is driven backward by the inertial energy of the vehicle, the drive pressure during travel is low, and the turning speed of the engine 1 is also low, the servo valve 82 is in either the K or J position, the piston cylinder 81 is moved to the left, as diagrammed, by the spring 91, and the discharge volume (cc/rev) is increased so that cavitation does not occur.

An unloading valve 100 is placed in the line 99 that branches off from the discharge line 2a of the travel hydraulic pump 2. On one end of the unloading valve 100 acts the discharge pressure from the travel hydraulic pump 2, while the other end is acted on by the drive pressure, during travel, of the first main circuit 7 or second main circuit 8, via the seventh pilot circuit 76, and by the force of a spring 101.

When the unloading valve 100 is activated, the return oil passes through the return lines 103 and 103a, and flows to the return relief circuit 15b from between the first restrictor unit 57 and the second restrictor unit 58. The line 103 is connected to the tenth pressure unit 61A of the control valve 60.

The unloading valve 100 is not activated while the control valve 60 is in the neutral position G and the travel valve 5 is in the neutral position A, and the discharge oil from the travel hydraulic pump 2 passes through the travel valve 5 in the neutral position A, opens the back-pressure valve 17, and returns to the tank 9.

When the control valve 60 is in the travel position H, the drive pressure during travel in the first main circuit 7 or second main circuit 8 acts on the other end of the unloading valve 100, via the seventh pilot circuit 76, matching the force of the spring 101, and raising the discharge pressure from the travel hydraulic pump 2 to or above the drive pressure during travel in the first main circuit 7 or second main circuit 8.

When the control valve 60 is in the relief position I due to the activation of the variable relief valve 52, the other end of the unloading valve 100 is connected to the tank 9 via the seventh pilot circuit 76, the relief position I, the sixth pilot circuit 75, and the intake circuit 13, and is at low pressure. When the pressure acting on the one end is low (at a low pressure when traveling forward or in reverse and the travel hydraulic motor 6 is driven backward by the inertial energy of the vehicle), that is, when the direction of travel, either forward or reverse, is in agreement with the control position of the travel valve 5 (i.e. the forward position B or reverse position C), the unloading valve 100 is not activated, and the discharge oil from the travel hydraulic pump 2 is sent to either the first main circuit 7 or the second main circuit 8 via the control position of the travel valve 5, whereupon cavitation is prevented.

When the vehicle is being operated in forward travel or reverse travel, or being switched to forward while in reverse, the unloading valve 100 configures a pressurizing unit 105 that raises the braking pressure even higher. This pressurizing unit 105 comprises the unloading valve 100 and the second restrictor unit 58. As described in the foregoing, when the variable relief valve 52 is activated and the control valve 60 is in the relief position I, the other end of the unloading valve 100 is at low pressure, and the pressure acting on the first end of the unloading valve 100 is high, that is, when the vehicle operation is being switched to reverse while moving forward, or to forward while traveling in reverse, the unloading valve 100 is activated, and the discharge oil from the travel hydraulic pump 2 flows from the intake circuit 13 to the tank 9 via the unloading valve 100, the return line 103, the return relief circuit 15b, and the second restrictor unit 58. At this time, the discharge oil from the travel hydraulic pump 2 that is unloaded is restricted by the second restrictor unit 58, so that its pressure rises, and this pressure acts on the variable relief valve 52, raising the adjustment pressure and making the braking force large.

To the engine 1, an accelerator pedal 110 for controlling a fuel supply apparatus (not shown) is provided. When the accelerator pedal 110 is depressed, increasing its volume, the fuel supplied to the engine 1 increases and its rotational speed increases.

In the discharge line 2a of the travel hydraulic pump 2 is placed a check valve 2b, so that, when changing forward-reverse directions on a slope, the vehicle does not descend the slope even when the unloading valve 100 unloads. This is also so that high pressure does not act on the travel hydraulic pump 2. When switching from forward travel to reverse travel or from reverse travel to forward travel, for example, the hydraulic pressure generated in the main circuit, that is, either the first main circuit 7 or the second main circuit 8, does not act on the travel hydraulic pump 2.

The travel operation is next described. The operation unit 48 is manipulated to run the work vehicle in the forward direction, for example, sending current to the first solenoid 45 of the pilot pressure supply valve 30, and thereby switching the pilot pressure supply valve 30 over to the forward position E. The pilot pressure supply valve 30 blocks the return to the tank 9 of oil from the discharge line 3a of the control hydraulic pump 3, whereupon the oil from the control hydraulic pump 3 returns to the tank 9 via the variable restrictor 18, producing a pressure responsive to the turning speed of the engine 1, detecting the turning speed of the engine 1, and supplying that pressure to the sixth pressure unit 92 in the servo valve 82 of the travel hydraulic pump 2 via the oil line 93 branching off from the discharge line 3a of the control hydraulic pump 3. The pilot pressure supply valve 30 receives the pressure driving the travel hydraulic motor 6 at the first port 31 from the first main circuit 7 connecting the travel valve 5 and the travel hydraulic motor 6, via the first pilot circuit 38, and supplies the drive pressure from the first main circuit 7 to the third pressure unit 61 of the control valve 60, as the pilot pressure (Pac), via the first port 31 to the fifth port 35, the fifth pilot circuit 42, and the control valve 60, switching the control valve 60 over to the travel position H. The pilot pressure supply valve 30 also supplies pilot pressure to the first pressure unit 26 of the travel valve 5 from the first port 31 via the second port 32 and the second pilot circuit 39, while the pilot pressure of the second pressure unit 28 is returned to the tank 9 via the fourth pilot circuit 41 and the pilot pressure supply valve 30, whereupon the travel valve 5 is switched over to the forward position B. The control valve 60 receives the drive pressure from the first main circuit 7, via the fifth pilot circuit 42, in the first port 66, and supplies the drive pressure as a pilot pressure (Pac) to the fifth pressure unit 90 in the travel hydraulic pump 2 via the fourth port 69 and the seventh pilot circuit 76.

When the pilot pressure supply valve 30 is switched over to the forward position E, the prescribed pressure in the first main circuit 7 restricted by the restrictor 29c in the travel valve 5 moves the travel valve 5 to the forward position B and the control valve 60 to the travel position H, being supplied to the fifth pressure unit 90 in the servo valve 82 of the travel hydraulic pump 2, whereupon the pressure oil discharged from the travel hydraulic pump 2 is supplied to the first main circuit 7, and the oil in the second main circuit 8 flows to the tank 9, turning the travel hydraulic motor 6 in the forward direction. At this time, the drive pressure driving the travel hydraulic motor 6 is at high pressure in order to start traveling, wherefore the servo valve 82 of the travel hydraulic pump 2 is in the J position, and the drive pressure moves the piston cylinder 81 to the right, as diagrammed, against the spring 91, reducing the discharge volume (cc/rev). Accordingly, the work vehicle begins traveling at a slow speed without jolting. At this time, furthermore, the control valve 60 is slowly activated and switched over by the restriction in the neutral position and by the restrictor 83 of the regulator 80, so that travel can be started without jolting.

At this time, moreover, the control valve 60 is in the travel position H, wherefore the oil in the piston head chamber 53b returns to the return relief circuit 15b via the eighth pilot circuit 77 and the sixth port 71 and fifth port 70 in the control valve 60, so that the return from the piston head chamber 53b to the return relief circuit 15b is rapid. For this reason, the drive pressure in the first main circuit 7 acts through the relief circuit 15a on one end of the variable relief valve 52 and in the piston bottom chamber 53a in the pressure unit 53, rapidly activating the piston unit 43, and causing the pressure due to travel in the first main circuit 7 to become the designated regulated pressure (420 kg/cm$^2$, for example).

When next, to raise the speed of travel, when the operator steps on the accelerator pedal 110 and increases its volume, the turning speed of the engine 1 rises, wherefore the discharge pressure of the control hydraulic pump 3 increases, and this high discharge pressure is supplied to the sixth pressure unit 92 of the servo valve 82 in the travel hydraulic pump 2. Meanwhile, when the travel speed increases, the drive pressure in the first main circuit 7 driving the travel hydraulic motor 6 decreases. This decreased drive pressure is supplied to the fifth pressure unit 90 of the servo valve 82 in the travel hydraulic pump 2 via the pilot pressure supply valve 30, control valve 60, and seventh pilot circuit 76. Thus the servo valve 82 moves the piston 81a to the left as diagrammed (FIG. 1) together with the spring 91 by the pressure oil flowing from the seventh pilot circuit 76 through the K position to the bottom side of the piston cylinder 81, thereby increasing the discharge volume (cc/rev) and increasing the speed of the vehicle. At this time, the high discharge pressure of the control hydraulic pump 3 acts on the back-pressure valve 17 to reduce the pressure on the oil returning from the travel hydraulic motor 6.

Next is described the case where the vehicle is decelerated while traveling at high speed. When the operator eases up on the accelerator pedal 110, the discharge pressure of the control hydraulic pump 3 decreases because the turning speed of the engine 1 decreases, and that decreased discharge pressure is supplied to the sixth pressure unit 92 of the servo valve 82 in the travel hydraulic pump 2. Because the work vehicle is traveling at high speed, moreover, the drive pressure driving it is also low. Nevertheless, in order to decelerate further, the travel hydraulic motor 6 receives a drive force opposite to the inertial energy of the vehicle, whereupon the drive pressure in the first main circuit 7 becomes a low pressure, and the pressure supplied to the fifth pressure unit 90 in the servo valve 82 also becomes lower. The servo valve 82, therefore, moves from the J position to the K position, and the oil on the bottom side of the piston cylinder 81 returns to the tank 9 via the restrictor 83 of the regulator 80 and the servo valve 82 in the K position. Thus the piston 81a is moved to the right as diagrammed (FIG. 1), reducing the discharge volume (cc/rev), but when it has moved a prescribed amount the piston 81a comes up against the spring 85 and stops, whereupon the discharge volume (cc/rev) of the travel hydraulic pump 2 is maintained at the prescribed value. The prescribed volume of oil discharged from this travel hydraulic pump 2 is sent via the discharge line 2a and the travel valve 5 in the forward position B to the first main circuit 7, thus maintaining the prescribed pressure (20 kg/cm$^2$, for example), whereupon cavitation is definitely prevented from occurring in the travel hydraulic motor 6. At this time, the oil returning to the tank 9 from the travel hydraulic motor 6 increases the oil volume supplied from the intake valve 12 to the first main circuit 7.

The case of traveling down a slope is next described.

When traveling down a slope, the inertial energy of the work vehicle increases, and the turning speed of the travel hydraulic motor 6 seeks to exceed a speed commensurate with the discharge quantity supplied from the travel hydraulic pump 2, that is to say, an overrun occurs, whereupon the pressure in the first main circuit 7 decreases. Accordingly, the pilot pressure acting from the first main circuit 7 on the first pressure unit 26 in the travel valve 5, via the first pilot circuit 38, the pilot pressure supply valve 30 in the forward position E, and the second pilot circuit 39, decreases.

The travel valve 5, therefore, is returned to the neutral position A from the forward position E by the first spring 25. When the travel valve 5 is returned to the neutral position A, the return oil discharged from the travel hydraulic motor 6 being driven by the inertial energy of the work vehicle is blocked from returning to the tank 9 by the second check valve 29b of the travel valve 5, and the pressure of the oil returning from the travel hydraulic motor 6 rises. Due to this rise in the pressure of the return oil of the travel hydraulic motor 6, a braking torque is produced which causes the turning speed of the travel hydraulic motor 6 to decelerate. Also, the pilot pressure that acts, from the first main circuit 7, on the third pressure unit 61 in the control valve 60, via the first pilot circuit 38, the pilot pressure supply valve 30 in the forward position E, the fifth pilot circuit 42, and the control valve 60 in the travel position H, is reduced. Therefore the control valve 60 is returned to the neutral position G from the forward position E by the spring 64.

The control valve 60 connects the seventh pilot circuit 76 connected to the servo valve 82 in the travel hydraulic pump 2 with the sixth pilot circuit 75 connected to the tank 9 via the intake circuit 13, and reduces the pilot pressure acting on the servo valve 82 in the travel hydraulic pump 2. The servo valve 82 is switched over to the K position by the discharge pressure of the control hydraulic pump 3 acting on the sixth pressure unit 92, and the oil on the bottom side of the piston cylinder 81 returns to the tank 9 via the restrictor 83 of the regulator 80 and the servo valve 82 in the K position. Thus the piston 81a is moved to the right, as diagrammed (FIG. 1), reducing the discharge volume (cc/rev), but when it moves a prescribed amount the piston 81a comes up against the spring 85 and stops, whereupon the discharge volume (cc/rev) of the travel hydraulic pump 2 is maintained at the prescribed value. This prescribed volume of oil discharged from the travel hydraulic pump 2 is sent via the discharge line 2a and the first check valve 29a of the travel valve 5 in the neutral position A to the first main circuit 7, and the prescribed pressure (20 kg/cm$^2$, for example) is maintained, while the oil returning to the tank 9 from the travel hydraulic motor 6 increases the oil volume supplied from the intake valve 12 to the first main circuit 7.

As a result of all this, the work vehicle will be braked, and overrun in the work vehicle will be prevented. When the work vehicle is braked and its speed decreases, the pressure in the first main circuit 7 will again rise, the travel hydraulic motor 6 will be balanced at a speed commensurate with the discharge quantity supplied from the travel hydraulic pump 2, and the work vehicle will travel down the slope.

Next will be described the case of the work vehicle being stopped from a traveling state.

The operator eases up on the accelerator pedal 110 and at the same time manipulates the operation unit 48 from the forward position to the neutral position. The turning speed of the engine 1 decreases, wherefore the discharge pressure of the control hydraulic pump 3 also decreases, and this lowered discharge pressure is supplied to the sixth pressure unit 92 of the servo valve 82 in the travel hydraulic pump 2. Due to the manipulation of the operation unit 48, the current that had been flowing to the first solenoid 45 stops, and the pilot pressure supply valve 30 returns to the neutral position D from the forward position E. As a result, the pressure driving the travel hydraulic motor 6 supplied to the first port 31 from the first main circuit 7 via the first pilot circuit 38 is shut off by the first port 31. Also, the supply of the pilot pressure (Pac) from the first main circuit 7 that had been acting on the third pressure unit 61 in the control valve 60 via the first port 31 is stopped, and the control valve 60 is returned to the neutral position G from the travel position H. Also, the supply of the pilot pressure to the first pressure unit 26 in the travel valve 5 via the first port 31 is stopped, and the travel valve 5 is returned to the neutral position A from the forward position B.

At this time, when the inertial energy of the work vehicle is large due to the cargo being carried, etc., the travel hydraulic motor will be subjected to the large opposite drive force caused by the inertial energy of the vehicle. The return oil in the second main circuit 8 discharged from the travel hydraulic motor 6 driven by the inertial energy of the work vehicle is prevented from returning to the tank 9 by the second check valve 29b in the travel valve 5, and the pressure on the oil returning from the travel hydraulic motor 6 rises. Due to the rise in pressure on the return oil of the travel hydraulic motor 6, a braking torque is developed which acts to slow down the turning speed of the travel hydraulic motor 6. This braking torque is generated by the pressure that is produced by the variable relief valve 52 when the return oil from the second main circuit 8 acts thereon via the check valve 14 acting as a relief valve. This pressure that is produced is determined by the size of the opposite drive force caused by the inertial energy of the vehicle.

In other words, since the control valve 60 is in the neutral position G, the oil returning to the return relief valve 15b from the piston head chamber 53b via the eighth pilot circuit 77 and the control valve 60 is shut off. At this time, the oil returning to the return relief circuit 15b from the piston head chamber 53b has its pressure raised by the restriction of the restrictor 55, the compression of the spring 52a by the piston unit 53 is retarded and weakened, and the pressure generated in the second main circuit 8 is adjusted by the variable relief valve 52 so that it becomes a braking pressure (a pressure variable from 150 to 420 kg/cm$^2$, for example) caused by the inertial energy of the vehicle. The pressure oil in this relief circuit 15a, after adjustment, flows to the return relief circuit 15b, and is supplied to the first main circuit 7 from the intake valve 12 via the intake circuit 13.

Also, because the control valve 60 is in the neutral position G, the discharge quantity of the travel hydraulic pump 2 acts in the same manner as when the vehicle is traveling down a slope, as described earlier.

The control valve 60 connects the seventh pilot circuit 76 connected to the servo valve 82 of the travel hydraulic pump 2 with the sixth pilot circuit 75 connected to the tank 9 via the intake circuit 13, and lowers the pilot pressure acting on the servo valve 82 of the travel hydraulic pump 2. The servo valve 82 is switched over to the K position by the discharge pressure of the control hydraulic pump 3 acting on the sixth pressure unit 92, and the oil on the bottom side of the piston cylinder 81 returns to the tank 9 via the restrictor 83 in the regulator 80 and the servo valve 82 in the K position. Therefore the piston 81a is moved to the right, as diagrammed, reducing the discharge volume (cc/rev). When it has moved the prescribed amount, the piston 81a comes up against the spring 85 and stops, and the discharge volume (cc/rev) of the travel hydraulic pump 2 is maintained at the prescribed value. The oil discharged from this travel hydraulic pump 2 in the prescribed volume (20 kg/cm$^2$, for example) is sent to the first main circuit 7, via the discharge line 2a and the first check valve 29a of the travel valve 5 in the neutral position A, wherefore cavitation is definitely prevented from occurring in the travel hydraulic motor 6. At this time, the oil returning to the tank 9 from the travel hydraulic motor 6 increases the oil volume supplied from the intake valve 12 to the first main circuit 7.

As a result of these operations, the work vehicle is braked, and the work vehicle can be stopped in a prescribed braking distance by a braking pressure caused by the inertial energy of the vehicle.

Next is described the case of changing the work vehicle from traveling forward to traveling in reverse.

Figure 4:
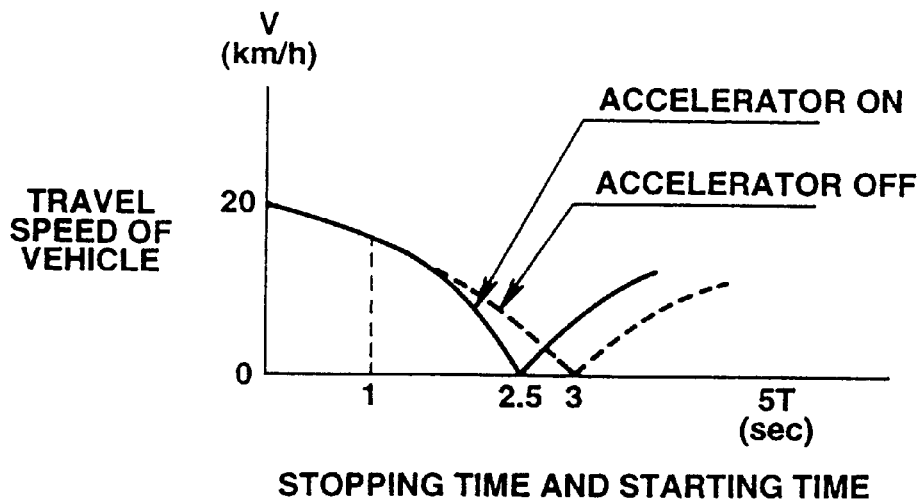
FIG. 4 is a graph plotting the relationship between travel speed and stopping time.

FIG. 4 is a graph plotting the relationship between travel speed V (km/h) and time. Vehicle speed V (km/h) is plotted on the vertical axis, and both stopping time and starting time (sec) are plotted on the horizontal axis. The solid curve in the graph represents the condition of manipulating (stepping on) the accelerator pedal when changing to the state of traveling in reverse from the state of traveling forward, while the dashed curve represents the condition wherein the accelerator pedal is not manipulated.

Figure 5:
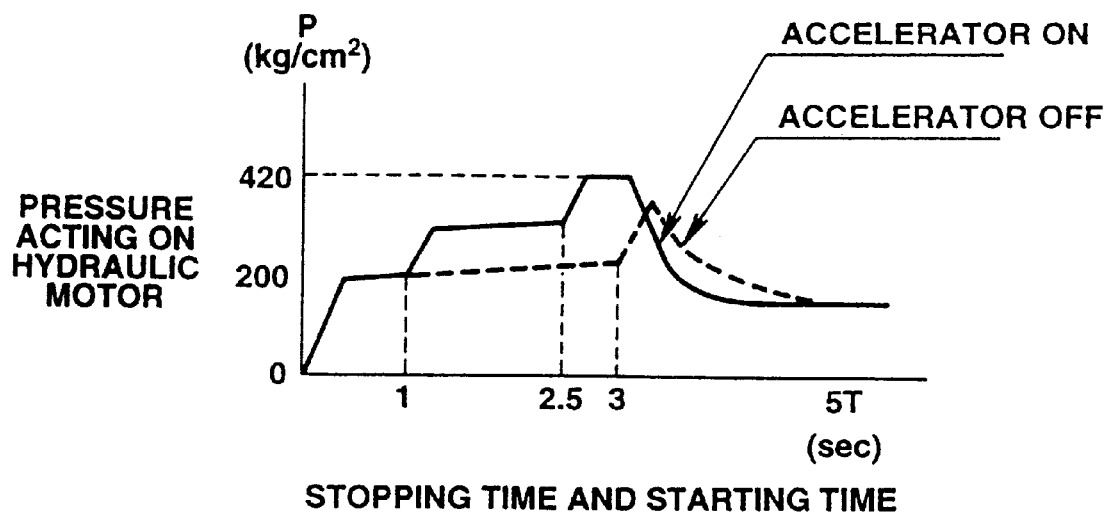
FIG. 5 is a graph plotting the relationship between the pressure acting on the travel hydraulic motor and time.

FIG. 5 is a graph plotting the relationship between the pressure P (adjustment pressure (kg/cm$^2$) at variable relief valve) acting on the travel hydraulic motor 6 and time. Pressure(kg/cm$^2$) is plotted on the vertical axis, and both stopping time and takeoff time (sec) on the horizontal axis. The solid curve in the graph represents the condition of manipulating (stepping on) the accelerator pedal either in the period during which reverse travel is changed to from a condition of forward travel, or in the period during which forward travel is changed to from a condition of reverse travel, while the dashed curve represents the condition wherein the accelerator pedal is not manipulated.

The operator eases up on the accelerator pedal 110 and, at the same time, manipulates the operation unit 48 from the forward position to the reverse position. The turning speed of the engine 1 decreases, so the discharge pressure of the control hydraulic pump 3 also decreases. This lowered discharge pressure is supplied to the sixth pressure unit 92 in the servo valve 82 of the travel hydraulic pump 2. The current that is flowing in the first solenoid 45 is stopped by the manipulation of the operation unit 48, and, at the same time, current begins flowing in the second solenoid 47, and the pilot pressure supply valve 30 is switched over from the forward position E to the reverse position F. The pilot pressure supply valve 30 receives, at the third port 33, the pressure driving the travel hydraulic motor 6 from the second main circuit 8 connecting the travel valve 5 and the travel hydraulic motor 6, and, from the third port 33, supplies the drive pressure from the second main circuit 8 as a pilot pressure (Pac) to the third pressure unit 61 in the control valve 60, via the fifth port 35, the fifth pilot circuit 42, and the control valve 60, switching the control valve 60 to the travel position H. Also, the pilot pressure supply valve 30 supplies pilot pressure from the third port 33 to the second pressure unit 28 in the travel valve 5, via the fourth port 34 and the fourth pilot circuit 41. The pilot pressure of the first pressure unit 26 is returned to the tank 9 via the second pilot circuit 39 and the pilot pressure supply valve 30, switching the travel valve 5 over to the reverse position C. The control valve 60 receives the drive pressure from the second main circuit 8 at the first port 66, via the fifth pilot circuit 42, and supplies the drive pressure as a pilot pressure (Pac) via the fourth port 69 and seventh pilot circuit 76 to the fifth pressure unit 90 in the servo valve 82 of the travel hydraulic pump 2.

The pilot pressure supply valve 30 is moved to the reverse position F, the travel valve 5 to the reverse position C, and the control valve 60 to the travel position H, while the drive pressure is supplied to the fifth pressure unit 91 in the servo valve 82 of the travel hydraulic pump 2. The discharge pressure of the travel hydraulic pump 2 is supplied to the second main circuit 8 and, at the same time, the oil in the first main circuit 7 flows to the tank 9 and turns the travel hydraulic motor 6 in the reverse position. However, by the changeover at reverse travel time, the pressure oil for reverse travel is supplied to the second main circuit 8 in which return oil is flowing during forward travel. At this time, the work vehicle is not stopped, so the travel hydraulic motor 6 is subjected to the opposite drive force caused by the inertial energy of the vehicle, the drive pressure in the first main circuit 7 becomes a low pressure, and a high pressure is developed in the second main circuit 8 due to the merging of the pressure oil for reverse travel from the travel hydraulic pump 2 and the return oil that discharges, acted upon by the opposite drive force of the travel hydraulic motor 6. The high pressure generated in the second main circuit 8 acts on the variable relief valve 52 via the check valve 14 acting as a relief valve, the variable relief valve 52 is activated by the high pressure so generated, the rotational speed in the forward direction is gradually reduced, and the vehicle is stopped.

For example, as indicated in FIG. 4, the vehicle moving forward at a travel speed of 20 (km/h) is switched over to travel in the reverse direction by manipulating the operation unit 48 from the forward position to the reverse position. In this case, when the operator eases up his or her foot pressure on the accelerator pedal, the vehicle stops at the 3-second position, as indicated by the dashed curve, and, as will be described in greater detail below, the control valve 60 is switched, so that the vehicle travels next in the forward direction.

When the variable relief valve 52 is activated and the oil, after adjustment, flows into the return relief circuit 15b, it is restricted by the restrictor unit 57, producing the prescribed pressure, which acts on the fourth pressure unit 63 from the eighth pilot circuit 78, and the control valve 60 is switched over to the relief position I when the variable relief valve 52 is activated.

As a result of this changeover, the control valve 60 is in the relief position I, so the oil returning from the piston head chamber 53b to the return relief circuit 15b via the eighth pilot circuit 77 and the control valve 60 is shut off. At this time, the oil returning from the piston head chamber 53b to the return relief circuit 15b has its pressure raised by the restriction of the restrictor 55, whereupon the compression of the spring 52a by the piston unit 53 is retarded and weakened, and the pressure produced in the second main circuit 8 is regulated by the variable relief valve 52 so that it becomes a braking pressure (a pressure variable from 150 to 420 kg/cm$^2$, for example) caused by the inertial energy of the vehicle. The pressure oil in this relief circuit 15a, after adjustment, flows into the return relief circuit 15b, and is supplied to the first main circuit 7 from the intake valve 12 via the intake circuit 13.

For example, as indicated in FIG. 5, the pressure of the return oil that the travelling hydraulic motor 6 discharges upon receipt of the reverse drive force gradually raises from roughly zero at the initial state to 200 kg/cm$^2$, due to the restrictor 55 in the variable relief valve unit 51, so that, the vehicle does not stop suddenly and develop jolting due to the braking pressure by the variable relief valve 52.

This pressure (200 kg/cm$^2$) continues for 3 seconds and stops the vehicle. After that, as will be described below in greater detail, the vehicle begins moving in reverse, and the pressure driving the travel hydraulic motor 6 in reverse rises further to 420 kg/cm$^2$.

When the control valve 60 is in the relief position I, the seventh pilot circuit 76 connecting to the servo valve 82 in the travel hydraulic pump 2 is connected with the sixth pilot circuit 75 connecting to the tank 9 via the intake circuit 13, whereupon the pilot pressure acting on the servo valve 82 of the travel hydraulic pump 2 is reduced.

The servo valve 82 is switched over to the K position by the discharge pressure of the control hydraulic pump 3 acting on the sixth pressure unit 92, and the oil on the bottom side of the piston cylinder 81 returns to the tank 9 via the restrictor 83 of the regulator 80 and the servo valve 82 in the K position. The piston 81a is thereby moved to the right, as diagrammed (FIG. 1), reducing the discharge volume (cc/rev). When it moves a prescribed amount, the piston 81a comes up against the spring 85 and stops, and the discharge volume (cc/rev) of the travel hydraulic pump 2 is maintained at the prescribed value.

At this time, the pilot pressure (Pac) described earlier acts at low pressure on the other end of the unloading valve 100, and the pressure acting on the first end of the unloading valve 100 rises because the discharge oil from the travel hydraulic pump 2 is cut off by the check valve 2b. For this reason, the unloading valve 100 is activated, and the discharge oil from the travel hydraulic pump 2 flows from the intake circuit 13 to the tank 9 via the unloading valve 100, return line 103, return relief circuit 15b, and second restrictor unit 58. At this time, the unloaded travel hydraulic pump 2 discharge oil is restricted by the second restrictor unit 58, which raises its pressure. This pressure acts on the variable relief valve 52, raising the adjustment pressure and making the braking force large. In addition to flowing from the intake circuit 13 to the tank 9, it is supplied from the intake valve 12 to the first main circuit 7, and cavitation ceases to occur in the first main circuit 7.

As explained in the foregoing, the oil volume supplied from the travel hydraulic pump 2 to the travel hydraulic motor 6 is maintained securely as a prescribed volume by the spring 85 provided in the regulator 80, wherefore, even when a switching operation is done, from forward travel to reverse travel or from reverse travel to forward travel, the oil volume supplied to the travel hydraulic motor 6 increases, and cavitation ceases to occur. Thus the back-and-forth manipulations that were very difficult with conventional open-circuit hydraulic drives become possible, and damage to hydraulic equipment is prevented. The variable relief valve 52 is used, and, in conjunction therewith, the braking pressure and braking time thereof is made so as to follow the inertial energy of the vehicle, so the braking distance can be made roughly constant irrespective of vehicle speed.

The pressure regulation with this second main circuit 8, and the supply of return oil to the first main circuit 7, are conducted until the work vehicle stops. When the work vehicle stops, the pressure regulation by the variable relief valve 52 stops, and the oil volume flowing to the return relief circuit 15b disappears. Thus the prescribed pressure acting on the fourth pressure unit 63 disappears, and the control valve 60 is returned to the neutral position G. At this time, the pilot pressure supply valve 30 is in the reverse position F, wherefore the control valve 60 supplies the pressure driving the travel hydraulic motor 6 to the third port 33 from the second main circuit 8 connecting the travel valve 5 and the travel hydraulic motor 6 via the third pilot circuit 40, and further supplies the drive pressure from the second main circuit 8, as pilot pressure (Pac), to the third pressure unit 61 from the pilot pressure supply valve 30 and the third port 33 via the fifth port 35 and the fifth pilot circuit 42, and switches the control valve 60 to the travel position H. The control valve 60 receives the drive pressure from the second main circuit 8, via the fifth pilot circuit 42, at the first port 66, and supplies the drive pressure as pilot pressure (Pac) to the fifth pressure unit 90 of the servo valve 82 in the travel hydraulic pump 2, via the seventh pilot circuit 76.

At this time, the drive pressure driving the travel hydraulic motor 6 is at high pressure for starting the vehicle traveling from forward to reverse, wherefore the servo valve 82 of the travel hydraulic pump 2 is in the J position, and the drive pressure acts against the spring 91 to move the piston cylinder 81 to the right, as diagrammed, thus reducing the discharge volume (cc/rev). Accordingly, the work vehicle begins to travel at a slow speed without jolting. At this time, furthermore, the control valve 60 is activated and switched over slowly by the restriction in the neutral position and the restrictor 83 in the regulator 80, wherefore travel in the reverse direction can be started without jolting. For example, as indicated by the dashed curve in FIG. 5, the pressure of the return oil that the travelling hydraulic motor 6 discharges upon receipt of the reverse drive force gradually raises from roughly zero at the initial state to 200 kg/cm$^2$, due to the restrictor 55 in the variable relief valve unit 51, so that, the vehicle does not stop suddenly and develop jolting due to the braking pressure by the variable relief valve 52. This pressure (200 kg/cm$^2$) continues for 3 seconds and stops the vehicle, after which, continuing on therefrom, it slowly rises to 380 kg/cm$^2$ and travel in the reverse direction is started. There is no sudden changeover, so the hydraulic equipment is not damaged.

At this time, moreover, because the control valve 60 is in the travel position H, the oil in the piston head chamber 53 returns to the return relief circuit 15b via the eighth pilot circuit 77, and the sixth port 71 and fifth port 70 in the control valve 60, wherefore that oil returns rapidly from the piston head chamber 53b to the return relief circuit 15b. For this reason, the drive pressure in the first main circuit 7 acts via the relief circuit 15a on one end of the variable relief valve 52 and in the piston bottom chamber 53a of the piston unit 53, whereupon the piston unit 53 is rapidly activated, so that the pressure due to travel in the first main circuit 7 becomes the prescribed adjustment pressure (420 kg/cm$^2$ for example).

In the foregoing description, the operator, in the example assumed, manipulates the operation unit 48 from the forward position to the reverse position, effecting a changeover to travel in the reverse direction, at which time, moreover, foot pressure on the accelerator pedal 110 is eased. Next, however, is described a case where, at such time, foot pressure on the accelerator pedal 110 is increased.

When foot pressure on the accelerator pedal 110 is increased, the rotational speed of the engine 1 is increased, along with which the discharge quantity QB from the travel hydraulic pump 2 increases. At this time, the discharge quantity QB, as described earlier, is secured at the prescribed volume by the spring 85 in the regulator 80. This discharge quantity QB from the travel hydraulic pump 2 flows from the intake circuit 13 to the tank 9 via the unloading valve 100, return line 103, return relief circuit 15b, and second restrictor unit 48, as in the previous description. At this time, the unloaded travel hydraulic pump 2 discharge oil is restricted by the second restrictor unit 58 so that its pressure rises. This pressure acts on the variable relief valve 52, raising the adjustment pressure and making the braking force large.

As indicated by the solid curve in FIG. 5, for example, when the operator manipulates the operation unit 48 from the forward position to the reverse position, switching over so as to travel in the reverse direction, the pressure of the return oil that the travelling hydraulic motor 6 discharges upon receipt of the reverse drive force gradually raises from roughly zero at the initial state to 200 kg/cm$^2$, due to the restrictor 55 in the variable relief valve unit 51, so that, the vehicle does not stop suddenly and develop jolting due to the braking pressure by the variable relief valve 52. And, as diagrammed, if foot pressure on the accelerator pedal 110 is increased 1 second later, for example, this pressure (200 kg/cm$^2$) is such that the discharge quantity QB from the travel hydraulic pump 2 increases along with the further increase in the rotational speed of the engine 1, whereby, as described earlier, the variable relief valve 52 increases the adjustment pressure to approximately 300 kg/cm$^2$ and increases the braking force. Due to this increase in braking force, should the foot pressure on the accelerator pedal 110 be eased, the vehicle stopping time, which was 3 seconds, is shortened to 2.5 seconds. After the vehicle has stopped, moreover, it will begin traveling in reverse. At that time, however, the discharge quantity QB from the travel hydraulic pump 2 has increased, wherefore, continuing therefrom, the pressure will increase to around 420 kg/cm$^2$ in a shorter time than when operated as described earlier, and the vehicle will begin traveling in reverse. For this reason, if foot pressure on the accelerator pedal 110 is increased, the stopping time is shortened, while, at the same time, the startup torque at reverse takeoff rises, vehicle acceleration performance rises, and takeoff performance is improved. At this time, furthermore, the oil returning via the second restrictor unit 58 is such that, because the discharge quantity QB from the travel hydraulic pump 2 is increased, the flow rate from the intake circuit 13 to the tank 9 is also increased, wherefore a large volume of oil is supplied from the intake valve 12 to the first main circuit 7, whereupon cavitation ceases to be produced in the first main circuit 7. As described earlier, the oil pressure going to the regulator 80 controlling the discharge quantity from the travel hydraulic pump 2 is received either from the first main circuit 7 connecting the travel valve 5 and the travel hydraulic motor 6, or from the second main circuit 8, via the control valve 60, wherefore, even should the discharge pressure of the travel hydraulic pump 2 be high, the discharge quantity from the hydraulic pump will no longer be reduced, whereupon cavitation will no longer be produced in the travel hydraulic motor 6. When the hydraulic pressure driving the travel hydraulic motor 6 is below the prescribed value, because a spring is provided in the hydraulic pump regulator to secure the prescribed discharge quantity, cavitation is no longer produced in the travel hydraulic motor 6, even when the vehicle is acted on by an opposite drive force.

The variable relief valve 52, moreover, when the vehicle is braking or decelerating, raises the pressure on the oil returning to the return relief circuit 15b from the piston head chamber 53b by restricting it by the restrictor 55, delaying and weakening the compression of the spring 52a by the piston unit 53, and makes the pressure generated in either the first main circuit 7 or second main circuit 8 a braking pressure (pressure variable from 150 to 420 kg/cm², for example) that is caused by the inertial energy of the vehicle, so that the direction of travel can be changed without jolting. The servo valve 82 in the travel hydraulic pump 2, furthermore, acts against the spring 91 to move the piston cylinder 81 to the right, as diagrammed (FIG. 1), reducing the discharge volume (cc/rev), wherefore the work vehicle can be made to begin traveling at a slow speed without jolting. At this time, moreover, the control valve 60 is slowly activated and switched, due to the restriction of the neutral position and the restrictor 83 in the regulator 80, wherefore travel can be commenced without jolting. When switching over from forward travel to reverse travel or from reverse travel to forward travel, while increasing foot pressure on the accelerator pedal 110, the variable relief valve 52 increases the adjustment pressure and increases the braking force. The stopping time is shortened by this increase in braking force, and, at the same time, the startup torque when starting off in reverse rises, improving the takeoff performance of the vehicle. By using a variable relief valve 52 that generates braking pressures that follow the inertial energy of the vehicle, the braking distance can be made roughly constant irrespective of vehicle speed, and work vehicle jolting during braking or deceleration can be eliminated. When foot pressure on the accelerator pedal 110 is reduced, the variable relief valve 52 reduces the adjustment pressure and reduces the braking force. Due to this reduction in braking force, the stopping time is lengthened, the braking distance can be made roughly constant irrespective of vehicle speed, and work vehicle jolting during braking or deceleration can be eliminated.

Figure 6:
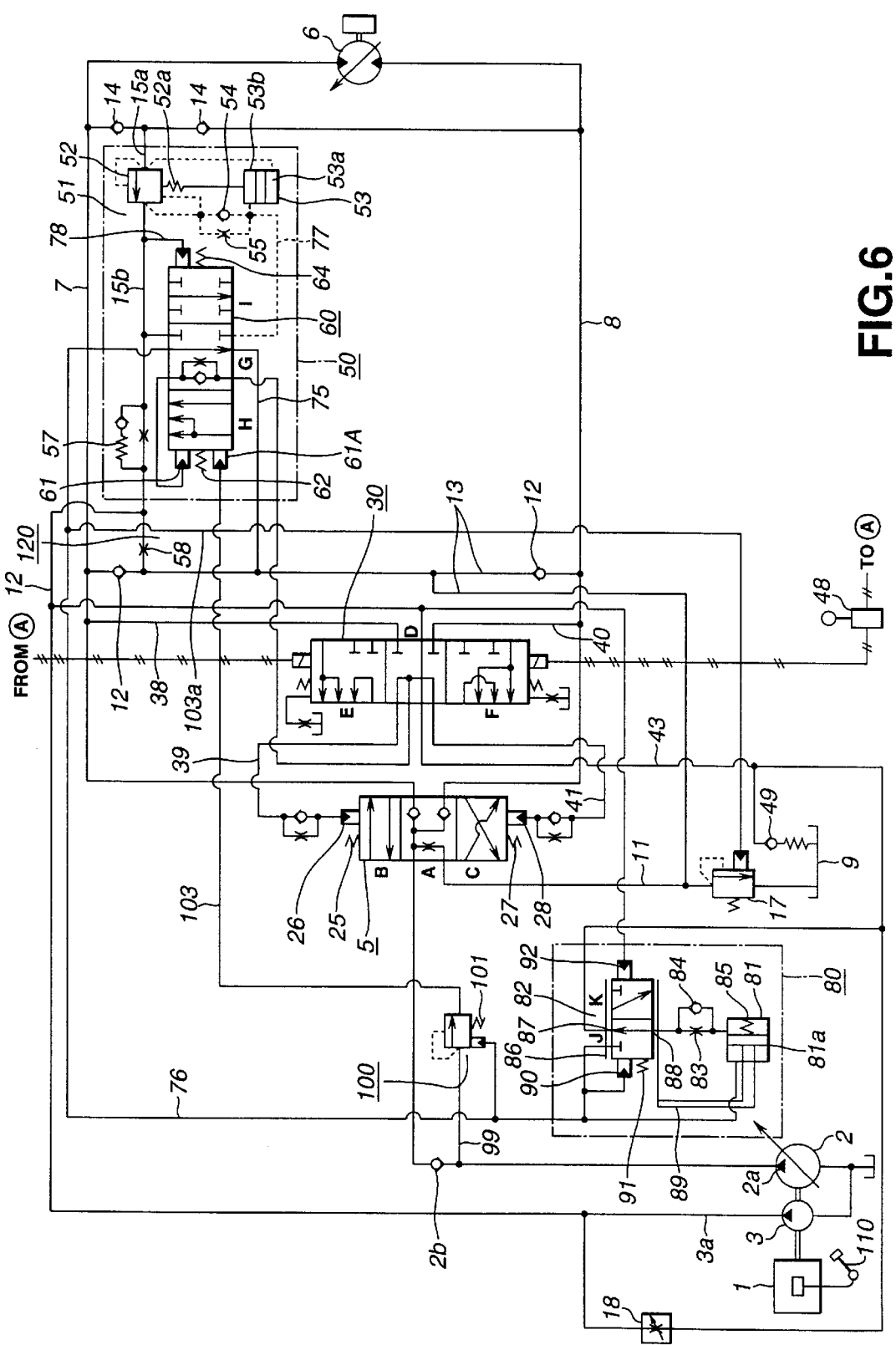
FIG. 6 is a hydraulic diagram for a second embodiment of the travel drive apparatus for a hydraulic drive work vehicle.

FIG. 6 is a hydraulic diagram of a travel drive apparatus for a hydraulic drive work vehicle in a second embodiment of the present invention. The same components as in the first embodiment are designated by the same symbols and their description is omitted.

A pressurizing unit 120 by which the pressure on the variable relief valve 52 is raised is driven by the engine 1, and comprises a control hydraulic pump 3 that discharges a discharge quantity QB according to the rotational speed of the engine 1, and a second restrictor unit 58, connected to the discharge line 3a from the control hydraulic pump 3, for producing control pressures according to the rotational speed of the engine 1.

With the pressurizing unit 105 of the first embodiment, the discharge pressure from the travel hydraulic pump 2 was supplied via the unloading valve 100 and return line 103 to a return relief circuit 15b between the variable relief valve 52 and second restrictor unit 58. With the pressurizing unit 120 in the second embodiment, however, the discharge oil from the control hydraulic pump 3 driven by the engine 1 is supplied, via a control line 121 that branches off from the discharge line 3a, to the return relief circuit 15b between the variable relief valve 52 and second restrictor unit 58. Thus the second restrictor unit 58 generates a control pressure in response to the discharge quantity from the control hydraulic pump 3, that is, a control pressure in response to the rotational speed of the engine 1, raises the return pressure at the variable relief valve 52 by this control pressure, and thus, by this return pressure, makes the adjustment pressure at the variable relief valve 52 variable in response to the rotational speed of the engine 1. When the vehicle is switched over from forward travel to reverse travel or from reverse travel to forward travel, for example, and, at the same time, the foot pressure on the accelerator pedal 110 is increased, the variable relief valve 52 increases the adjustment pressure in response to the rotational speed of the engine 1, thereby increasing the braking force. When foot pressure on the accelerator pedal 110 is reduced, the variable relief valve 52 reduces the adjustment pressure, thereby reducing the braking pressure.

The operation is the same as in the first embodiment and so is not further described here.

Figure 7:
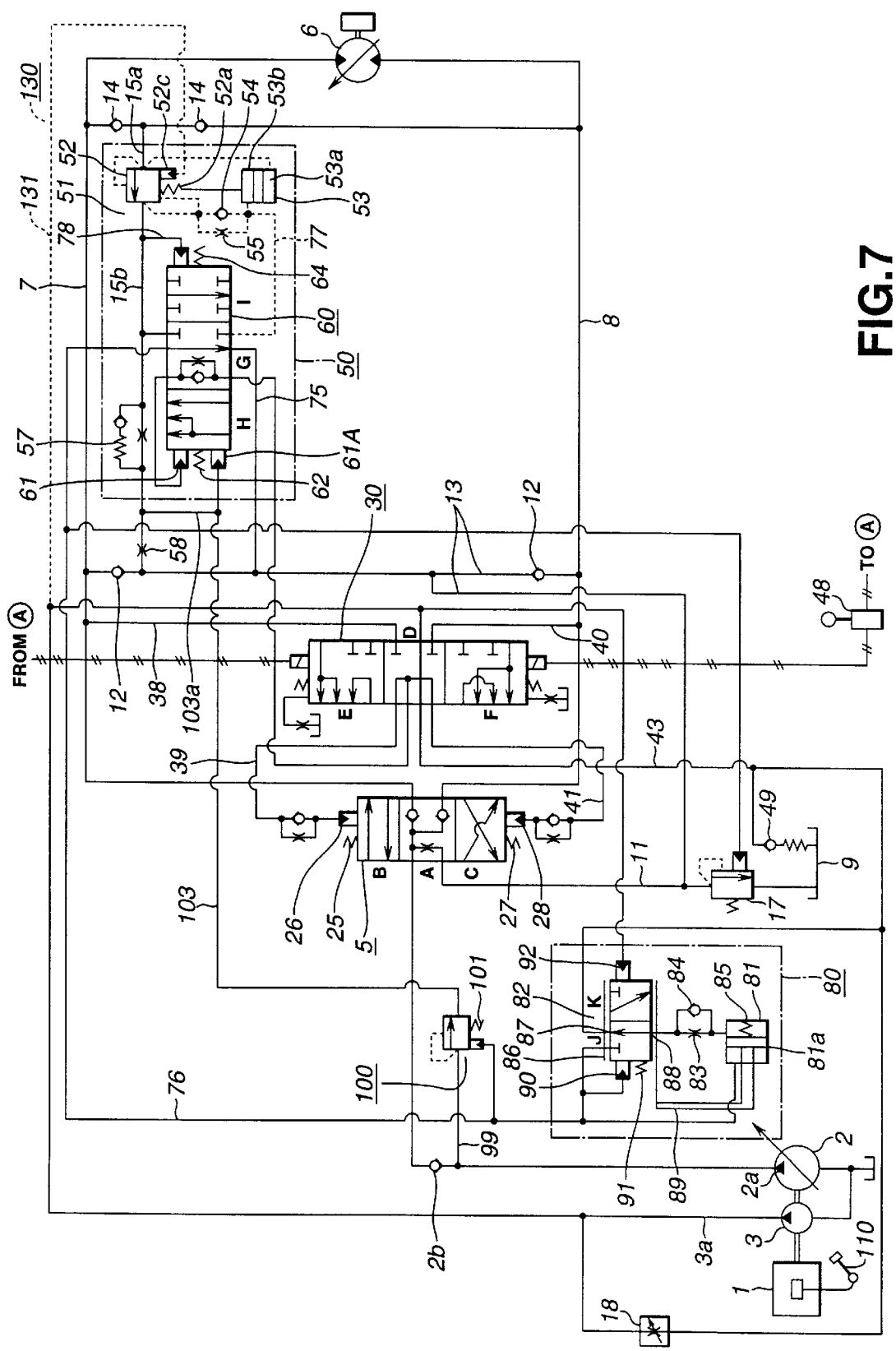
FIG. 7 is a hydraulic diagram for a third embodiment of the travel drive apparatus for a hydraulic drive work vehicle.

FIG. 7 is a hydraulic diagram of a travel drive apparatus for a hydraulic drive work vehicle in a third embodiment of the present invention. The same components as in the first embodiment are designated by the same symbols and their description is omitted.

A pressurizing unit 130, wherewith the pressure at the variable relief valve 52 is raised, comprises a control hydraulic pump 3 driven by the engine 1, and a variable restrictor 18, connected to the discharge line 3a from the control hydraulic pump 3, for producing control pressures in response to the rotational speed of the engine 1.

With the pressurizing unit 105 of the first embodiment, the discharge pressure from the travel hydraulic pump 2 was supplied via the unloading valve 100 and return line 103 to a return relief circuit 15b between the variable relief valve 52 and second restrictor unit 58. With the pressurizing unit 130 in the third embodiment, however, a control line 131 branching off from the discharge line 3a from the control hydraulic pump 3 is connected to a pressure unit 52c at the other end of the variable relief valve 52, and control pressures responsive to the rotational speed of the engine 1, working with the piston unit 53 and spring 52a, compress the variable relief valve 52. Therefore the variable restrictor 18 produces control pressures responsive to the discharge quantity of the control hydraulic pump 3, which is to say control pressures responsive to the rotational speed of the engine 1. By these control pressures the return pressure at the variable relief valve 52 is raised. By this return pressure the adjustment pressure of the variable relief valve 52A is made variable in response to the rotational speed of the engine 1. When the vehicle is switched over from forward travel to reverse travel or from reverse travel to forward travel, and, at the same time, foot pressure on the accelerator pedal 110 is increased, the variable relief valve 52 increases the adjustment pressure and increases the braking pressure. When foot pressure on the accelerator pedal 110 is reduced, the variable relief valve 52 reduces the adjustment pressure and reduces the braking pressure.

The operation is the same as in the first embodiment and so is not further described here.

Figure 8:
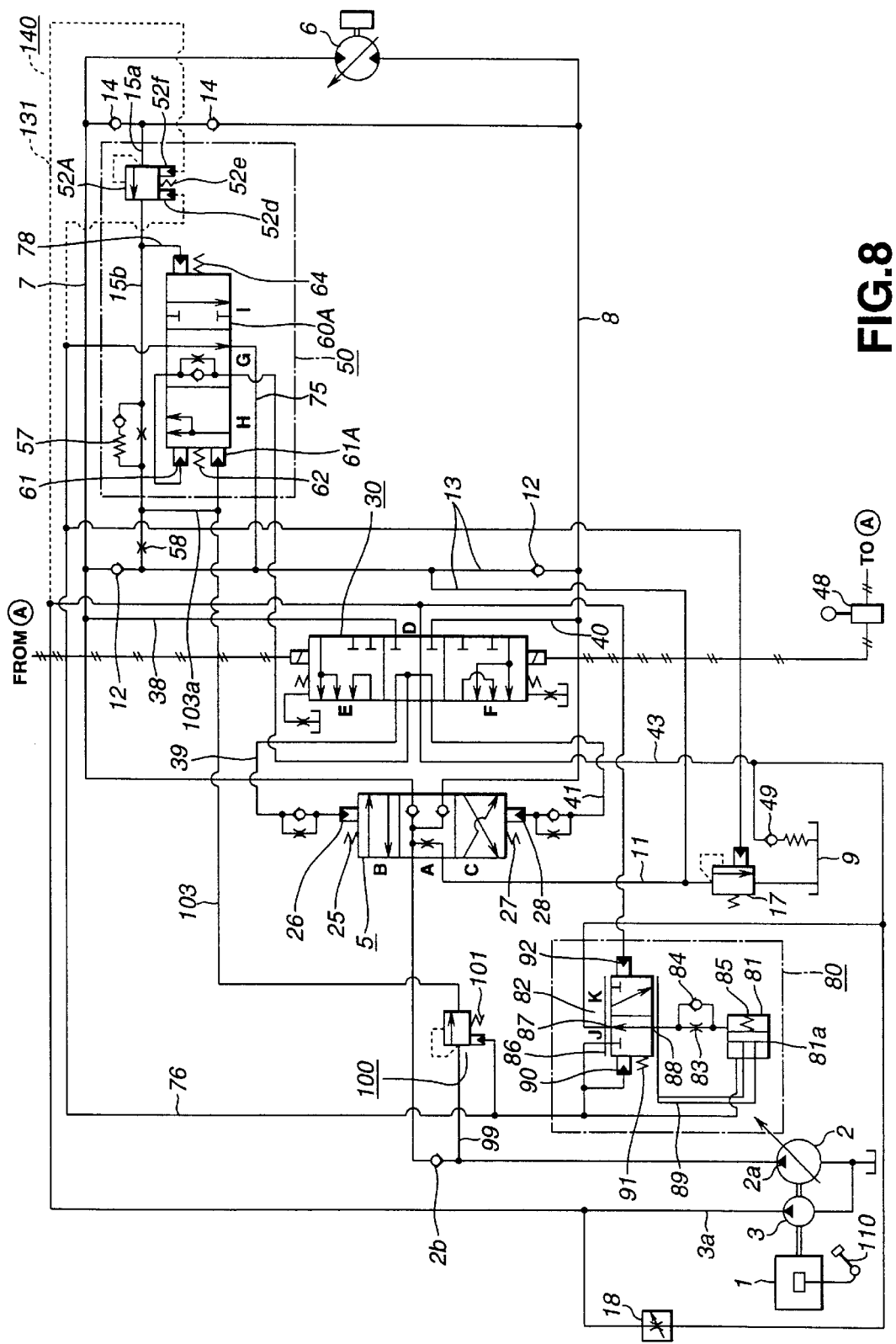
FIG. 8 is a hydraulic diagram for a fourth embodiment of the travel drive apparatus for a hydraulic drive work vehicle.
Figure 9:
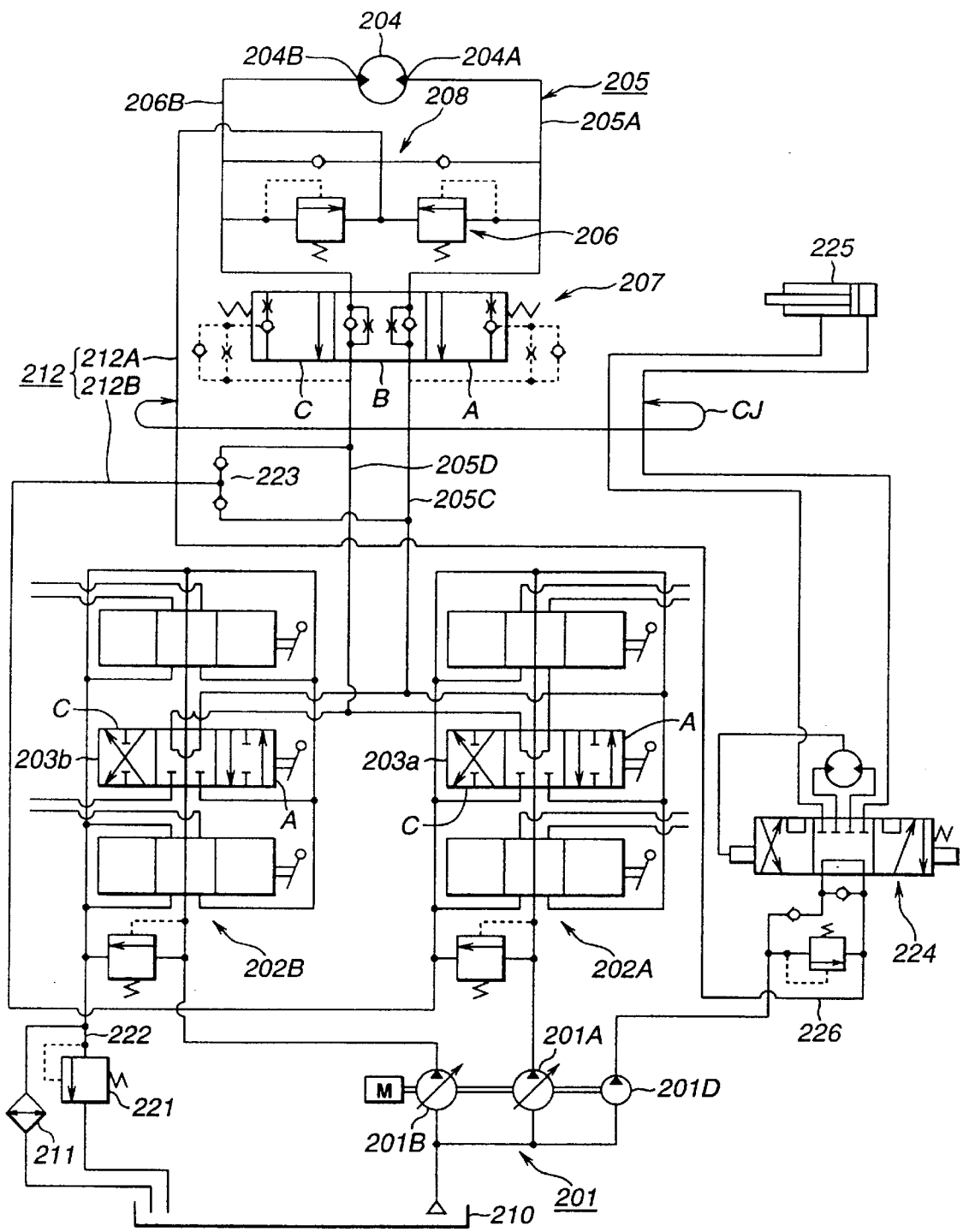
FIG. 9 is a hydraulic diagram for a conventional travel hydraulic motor.

FIG. 8 is a hydraulic diagram of a travel drive apparatus for a hydraulic drive work vehicle in a fourth embodiment of the present invention. The same components as in the first embodiment are designated by the same symbols and their description is omitted.

In the fourth embodiment, as in the third embodiment, when the vehicle is switched over from forward travel to reverse travel or from reverse travel to forward travel, and, at the same time, foot pressure on the accelerator pedal 110 is increased, the variable relief valve 52 increases the adjustment pressure, and the braking force is increased, but the configuration is different.

In the fourth embodiment, the pressure in the relief circuit 15a is led in so that it acts on one end of the variable relief valve 52A, while at the other end thereof is installed a first pressure chamber 52d, spring 52e, and second pressure chamber 52f. To the first pressure chamber 52d is connected a pilot circuit 76a that branches off from the seventh pilot circuit 76, which, together with the servo valve 82 of the travel hydraulic pump 2, is acted on by drive pressure from either the first main circuit 7 or second main circuit 8. To the second pressure chamber 52f is connected a control line 131 that branches off from the discharge line 3a from the control hydraulic pump 3, which is acted on by control pressures in response to the rotational speed of the engine 1.

The variable relief valve 52A, when the vehicle is traveling normally in the forward or reverse direction, is acted on by the spring 52e, the drive pressure received in the first pressure chamber 52d, and the control pressure responsive to rotational speed that is received in the second pressure chamber 52f, and maintains high pressure, causing the vehicle to travel. When the variable relief valve 52A is activated while the vehicle is stopped, decelerating, or being switched over from forward travel to reverse travel or from reverse travel to forward travel, it is acted on by the spring 52e and the control pressure response to rotational speed received in the second pressure chamber 52f, and maintains the prescribed pressure, causing the vehicle to brake.

The control valve 60 in the first embodiment is configured with three positions and six ports, but the control valve 60a in the fourth embodiment is configured with three positions and four ports. In the fourth embodiment, furthermore, the sixth port 71 connected to the piston head chamber 53B by the eighth pilot circuit 77 and the fifth port 70 connecting to the relief circuit 15b of the first embodiment are done away with.

A pressurizing unit 140 is such that the control pressure responsive to the rotational speed of the engine 1, via the control line 131 branching off from the discharge line 3a from the control hydraulic pump 3, acts on the second pressure chamber 52f at the other end of the variable relief valve 52A, while the drive pressure from the first main circuit 7 or second main circuit 8 act on the first pressure chamber 52d, and, by the compression of the spring 52e, raises the pressure at the variable relief valve 52A.

At this time, the variable restrictor 18 produces a control pressure responsive to the discharge quantity from the control hydraulic pump 3, that is to say a control pressure responsive to the rotational speed of the engine 1. This control pressure acts on the second pressure chamber 52f, making the adjustment pressure of the variable relief valve 52A variable in response to the rotational speed of the engine 1. Accordingly, when the vehicle is switched over from forward travel to reverse travel or from reverse travel to forward travel, and, at the same time, foot pressure on the accelerator pedal 110 is increased, the variable relief valve 52 increases the adjustment pressure and increases the braking force. When foot pressure on the accelerator pedal 110 is reduced, the variable relief valve 52 reduces the adjustment pressure and reduces the braking force.

The operation is the same as in the first embodiment and so is not further described here.

What is claimed is:

1. A travel drive apparatus for a hydraulic drive work vehicle including a travel hydraulic pump driven by a power of an engine; a hydraulic motor that receives discharged oil from the travel hydraulic pump and causes a vehicle to travel; a travel changeover valve that receives the discharged oil from the travel hydraulic pump, supplies the discharged oil to the hydraulic motor and discharges return oil from the hydraulic motor to a tank, wherein the apparatus comprises:

acceleration means for controlling an engine rotational speed;

operation means for selecting vehicle forward travel, stop, or reverse travel;

the travel changeover valve being adapted for switching the discharged oil supplied from the travel hydraulic pump to the hydraulic motor by receiving a signal from the operation means, and controlling vehicle forward travel, stop, and reverse travel;

a relief valve disposed between the travel changeover valve and the hydraulic motor, for regulating pressure for controlling the hydraulic motor when the vehicle is decelerated; and pressurizing means for raising set pressure at the relief valve controlling the hydraulic motor when an engine rotational speed is increased and lowering the set pressure at the relief valve controlling the hydraulic motor when the engine rotational speed is decreased, while switching the vehicle from forward travel to reverse travel, or from reverse travel to forward travel.

2. The travel drive apparatus for a hydraulic drive work vehicle according to claim 1, wherein the pressurizing means comprises:

an unloading valve for lowering a discharge pressure of the travel hydraulic pump while switching the vehicle from forward travel to reverse travel or from reverse travel to forward travel; and a restrictor valve positioned between the relief valve and the tank, for restricting the discharged oil from the travel hydraulic pump via the unloading valve and raising the set pressure at the relief valve, while switching the vehicle from forward travel to reverse travel or from reverse travel to forward travel.

3. The travel drive apparatus for a hydraulic drive work vehicle according to claim 1, wherein the pressurizing means comprises:

a control hydraulic pump that is driven by engine power, for discharging a quantity of oil in accordance with an engine rotational speed; and a restrictor valve positioned between the relief valve and the tank, for restricting discharged oil from the control hydraulic pump and raising the set pressure at the relief valve, while switching the vehicle from forward travel to reverse travel or from reverse travel to forward travel.

4. The travel drive apparatus for a hydraulic drive work vehicle according to claim 1, wherein the pressurizing means comprises:

a control hydraulic pump driven by engine power; and a restrictor valve for restricting the discharge oil by being connected to the control hydraulic pump to generate a control pressure in accordance with an engine rotational speed, and supplying the control pressure to the relief valve to raise the set pressure.

5. The travel drive apparatus for a hydraulic drive work vehicle according to claim 1, wherein the relief valve comprises:

a piston unit connected to the relief valve, for making variable the pressure regulation of the relief valve; and a control valve that is connected to the piston unit and switched by detecting activation of the relief valve, and that cuts off a circuit from the piston unit to the tank to make the relief valve variable.

6. The travel drive apparatus for a hydraulic drive work vehicle according to claim 1, wherein the travel hydraulic pump comprises a variable-delivery type hydraulic pump equipped with a regulator, the regulator including:

a servo valve that is actuated by receiving pressure for driving the hydraulic motor at one end thereof and a signal responsive to the engine rotational speed at the other end thereof; and a piston cylinder that receives the pressure for driving the hydraulic motor in one chamber thereof and the pressure for driving the hydraulic motor via the servo valve in another chamber thereof, that houses a spring, and that discharges, from the travel variable delivery hydraulic pump, a quantity of oil such that the pressure for driving the hydraulic motor is made a prescribed value or less by a spring force, when the engine rotational speed is at or below a prescribed value and the hydraulic motor is driven by an inertial energy of the vehicle.

7. A control method for a travel drive apparatus for a hydraulic drive work vehicle comprising a travel hydraulic pump driven by engine power; a hydraulic motor that receives discharged oil from the travel hydraulic pump and causes a vehicle to travel; and a travel changeover valve that receives the discharged oil from the travel hydraulic pump, supplies the discharged oil to the hydraulic motor and discharges return oil from the hydraulic motor to a tank, wherein:

a quantity of discharged oil from a control pump is increased to accord with an engine rotational speed, when the engine rotational speed is increased while switching the vehicle from forward travel to reverse travel or from reverse travel to forward travel;

the discharged oil is restricted, thereby raising its pressure;

the pressure is sent to a relief valve; and a set pressure at the relief valve is raised to brake the hydraulic motor.

* * * * *